United States Patent
Wu et al.

(10) Patent No.: US 11,018,913 B2
(45) Date of Patent: *May 25, 2021

(54) MULTICHANNEL-BASED SIGNAL TRANSMISSION METHOD AND APPARATUS

(71) Applicant: Huawei Technologies Co., Ltd., Shenzhen (CN)

(72) Inventors: Tao Wu, Shenzhen (CN); Teyan Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/588,541

(22) Filed: Sep. 30, 2019

(65) Prior Publication Data

US 2020/0099557 A1    Mar. 26, 2020

Related U.S. Application Data

(63) Continuation of application No. 16/246,761, filed on Jan. 14, 2019, now Pat. No. 10,461,974, which is a
(Continued)

(30) Foreign Application Priority Data

Jul. 15, 2016  (CN) .................. 201610563156.X
Sep. 20, 2016  (CN) .................. 201610835470.9
(Continued)

(51) Int. Cl.
  *H04L 27/20*    (2006.01)
  *H04L 5/00*     (2006.01)
  (Continued)

(52) U.S. Cl.
  CPC ........ *H04L 27/2057* (2013.01); *H04L 5/0007* (2013.01); *H04L 27/183* (2013.01);
  (Continued)

(58) Field of Classification Search
  CPC ................. H04L 27/34; H04B 7/024
  (Continued)

(56) References Cited

U.S. PATENT DOCUMENTS 7,149,259 B1   12/2006  Settle et al.
8,259,848 B2    9/2012  Malladi
(Continued)

FOREIGN PATENT DOCUMENTS

CN    101521529 A    9/2009
CN    101682497 A    3/2010
(Continued)

OTHER PUBLICATIONS

Chen, Z. et al., "Optimized LDPC Codes for High-order Modulation Systems," Video Engineering, 2013, Issue 17, 5 pages.
(Continued)

*Primary Examiner* — Fabricio R Murillo Garcia
(74) *Attorney, Agent, or Firm* — Slater Matsil, LLP

(57) ABSTRACT

This application provides a multichannel-based signal transmission method and apparatus. The method includes: combining N groups of lower-order modulation symbols into N groups of higher-order modulation symbols, where an ith higher-order modulation symbol in each group of higher-order modulation symbols is obtained by combining ith lower-order modulation symbols in all the N groups of lower-order modulation symbols, each group of lower-order modulation symbols includes M lower-order modulation symbols, i=1, 2, . . . , M, N is a positive integer greater than 1, and M is a positive integer greater than 1; determining N to-be-sent signals based on the N groups of higher-order modulation symbols; and sending a kth to-be-sent signal in the N to-be-sent signals by using a kth channel in N channels, where k=1, 2, . . . , N.

14 Claims, 6 Drawing Sheets

Related U.S. Application Data continuation of application No. PCT/CN2017/088103, filed on Jun. 13, 2017.

(30) Foreign Application Priority Data

| Nov. 28, 2016 | (CN) | 201611066050.5 |
| Dec. 16, 2016 | (CN) | 201611173792.8 |

(51) Int. Cl.
  *H04L 27/26* (2006.01)
  *H04L 27/34* (2006.01)
  *H04L 27/18* (2006.01)

(52) U.S. Cl.
  CPC ...... *H04L 27/2042* (2013.01); *H04L 27/2605* (2013.01); *H04L 27/3488* (2013.01); *H04L 5/001* (2013.01); *H04L 5/0046* (2013.01)

(58) Field of Classification Search
  USPC ........................................................ 375/298
  See application file for complete search history.

(56) References Cited

U.S. PATENT DOCUMENTS

| 2005/0015703 | A1  |  1/2005 | Terry et al. |              |
| 2009/0052375 | A1* |  2/2009 | Kalhan       | H04L 27/38   |
|              |     |         |              | 370/328      |
| 2010/0124214 | A1* |  5/2010 | Karaoguz     | H04W 4/08    |
|              |     |         |              | 370/338      |
| 2010/0232348 | A1  |  9/2010 | Wu et al.    |              |
| 2011/0135029 | A1  |  6/2011 | Wu et al.    |              |
| 2013/0039236 | A1  |  2/2013 | Malladi      |              |
| 2014/0035693 | A1  |  2/2014 | Li et al.    |              |
| 2014/0321564 | A1* | 10/2014 | Kenney       | H04L 25/03019|
|              |     |         |              | 375/260      |
| 2015/0341144 | A1* | 11/2015 | Myung        | H04L 27/34   |
|              |     |         |              | 375/261      |
| 2018/0076993 | A1* |  3/2018 | Seo          | H04J 15/00   |
| 2018/0191538 | A1* |  7/2018 | Murakami     | H04L 27/0008 |
| 2018/0351681 | A1* | 12/2018 | Ma           | H04W 4/70    |
| 2019/0239166 | A1* |  8/2019 | Yang         | H04W 52/281  |

FOREIGN PATENT DOCUMENTS

| CN | 102769599 A  | 11/2012 |
| CN | 102916783    |  2/2013 |
| CN | 103119877 A  |  5/2013 |
| CN | 103493454 A  |  1/2014 |
| EP | 1232621 B1   |  1/2005 |
| EP | 2326055 A1   |  5/2011 |
| JP | 2003515975 A |  5/2003 |
| JP | 2010529789 A |  8/2010 |
| RU | 2313912 C2   | 12/2007 |
| WO | 2008154506 A1| 12/2008 |
| WO | 2010029615 A1|  3/2010 |
| WO | 2015180186 A1| 12/2015 |

OTHER PUBLICATIONS

Lomayev, A. et al., "Performance Comparison of Dual Carrier and Regular Modulations for SU-MIMO in 11ay," IEEE 802.11-16/0631r0, May 16, 2015, 17 pages.

\* cited by examiner

User equipment 2

User equipment 3

User equipment 1

Base station

MULTICHANNEL-BASED SIGNAL TRANSMISSION METHOD AND APPARATUS

CROSS-REFERENCE TO RELATED APPLICATIONS

This application is a continuation of U.S. patent application Ser. No. 16/246,761, filed on Jan. 14, 2019, which is a continuation of International Application No. PCT/CN2017/088103, filed on Jun. 13, 2017, which claims priority to Chinese Patent Application No. 201610563156.X, filed on Jul. 15, 2016, and Chinese Patent Application No. 201610835470.9, filed on Sep. 20, 2016, and Chinese Patent Application No. 201611066050.5, filed on Nov. 28, 2016, and Chinese Patent Application No. 201611173792.8, filed on Dec. 16, 2016. All of the afore-mentioned patent applications are hereby incorporated by reference in their entireties.

TECHNICAL FIELD

Embodiments of this application relate to the communications field, and in particular, to a multichannel-based signal transmission method and apparatus.

BACKGROUND

A wireless local area network subsystem corresponding to the 802.11ad protocol operates on a frequency band of 60 GHz, and is mainly used to transmit wireless high-definition audio and video signals inside a home, to provide a more complete high-definition video solution for a home multimedia application. However, in the current 802.11ad protocol, only one channel can be used once to transmit a signal. To improve a transmission throughput, a plurality of channels can be simultaneously used to transmit a signal in a next-generation 802.11ad protocol. Channel aggregation is a multichannel-based signal transmission manner. When a signal is transmitted through channel aggregation, how to further improve signal transmission reliability is a problem that needs to be resolved urgently.

SUMMARY

This application provides a multichannel-based signal transmission method and apparatus, to transmit one signal on different channels, implement signal diversity transmission, and improve signal transmission reliability.

According to a first aspect, a multichannel-based signal transmission method is provided. The method includes combining N groups of lower-order modulation symbols into N groups of higher-order modulation symbols. An $i^{th}$ higher-order modulation symbol in each group of higher-order modulation symbols is obtained by combining $i^{th}$ lower-order modulation symbols in all the N groups of lower-order modulation symbols. Each group of lower-order modulation symbols includes M lower-order modulation symbols, $i=1, 2, \ldots, M$, N is a positive integer greater than 1, and M is a positive integer greater than 1. The method also includes determining N to-be-sent signals based on the N groups of higher-order modulation symbols. The method also includes sending a $k^{th}$ to-be-sent signal in the N to-be-sent signals using a $k^{th}$ channel in N channels, where $k=1, 2, \ldots, N$.

It may be understood that, each lower-order modulation symbol corresponds to one constellation point in a constellation diagram, and each higher-order modulation symbol is corresponding to one constellation point in the constellation diagram. A plurality of groups of lower-order modulation symbols are combined into a plurality of groups of higher-order modulation symbols, and the plurality of groups of higher-order modulation symbols are sent using a plurality of channels. In this way, one lower-order modulation symbol can be transmitted on different channels, and signal diversity transmission can be implemented.

Therefore, according to the multichannel-based signal transmission method in this application, a plurality of groups of lower-order modulation symbols are combined into a plurality of groups of higher-order modulation symbols, a plurality of to-be-sent signals are determined based on the plurality of groups of higher-order modulation symbols, and the plurality of to-be-sent signals are sent using a plurality of channels. In this way, one signal can be transmitted on different channels, signal diversity transmission can be implemented, and signal transmission reliability can be improved.

Optionally, a value of N is 2 or 3, and a value of M is 448.

With reference to the first aspect, in a first possible implementation of the first aspect, the combining N groups of lower-order modulation symbols into N groups of higher-order modulation symbols includes: forming an $i^{th}$ column vector by using the $i^{th}$ lower-order modulation symbol in each of the N groups of lower-order modulation symbols; and determining a product of a row vector of an $s^{th}$ row in a matrix Q and the $i^{th}$ column vector as an $i^{th}$ higher-order modulation symbol in an $s^{th}$ group of higher-order modulation symbols in the N groups of higher-order modulation symbols, where $s=1, 2, \ldots, N$.

The row vector of the $s^{th}$ row in the matrix Q is a row vector including elements in the $s^{th}$ row in the matrix. Generally, the first element in the $s^{th}$ row is used as the first element of the row vector, and an $i^{th}$ element in the $s^{th}$ row is used as an $i^{th}$ element of the row vector. The forming an $i^{th}$ column vector using the $i^{th}$ lower-order modulation symbol in each of the N groups of lower-order modulation symbols may be specifically understood as follows: An $i^{th}$ lower-order modulation symbol in the first group is used as the first element of the $i^{th}$ column vector; an $i^{th}$ lower-order modulation symbol in the second group is used as the second element of the $i^{th}$ column vector; and by analogy, an $i^{th}$ lower-order modulation symbol in an $N^{th}$ group is used as an $N^{th}$ element of the $i^{th}$ column vector.

In addition, it is easy to learn that the matrix Q is a matrix of N rows and N columns.

To be specific, when a plurality of groups of lower-order modulation symbols are combined into a plurality of groups of higher-order modulation symbols, the process may be specifically implemented through multiplication between matrices, so that implementation of a transmitter can be simplified.

With reference to the first possible implementation of the first aspect, in a second possible implementation of the first aspect, the determining N to-be-sent signals based on the N groups of higher-order modulation symbols includes: determining N first guard intervals; and inserting a $t^{th}$ first guard interval in the N first guard intervals at a location following a $t^{th}$ group of higher-order modulation symbols in the N groups of higher-order modulation symbols, to obtain a $t^{th}$ to-be-sent signal, where $t=1, 2, \ldots, N$.

Optionally, each first guard interval is formed by a 64-bit Golay sequence.

With reference to the second possible implementation of the first aspect, in a third possible implementation of the first aspect, the determining N first guard intervals includes: determining N groups of first guard signals, where each of the N groups of first guard signals includes G first guard signals, and G is a positive integer greater than 1; and determining a sequence formed by a $t^{th}$ group of first guard signals in the N groups of first guard signals as the $t^{th}$ first guard interval in the N first guard intervals.

Optionally, a value of G is 64.

With reference to the second possible implementation of the first aspect, in a fourth possible implementation of the first aspect, the determining N first guard intervals includes: determining N groups of first guard signals, where each of the N groups of first guard signals includes G first guard signals, and G is a positive integer greater than 1; forming an $r^{th}$ column vector using an $r^{th}$ first guard signal in each of the N groups of first guard signals, where r=1, 2, . . . , G; and determining a product of the row vector of the $s^{th}$ row in the matrix Q and the $r^{th}$ column vector as an $r^{th}$ first guard signal in an $s^{th}$ first guard interval in the N first guard intervals.

To be specific, the determined N groups of guard signals are combined to obtain N groups of combined guard signals, each group of combined guard signals forms a guard interval, and the guard interval formed by each group of combined guard signals is inserted at a location following a group of higher-order modulation symbols, to form a to-be-sent signal.

Alternatively, it may be understood as follows. The N groups of lower-order modulation symbols and the determined guard signals are combined in a same manner, to respectively obtain the N groups of higher-order modulation symbols and combined guard signals, and the higher-order modulation symbols and guard intervals formed by the combined guard signals form to-be-sent signals. In this way, a receiver can perform discrete fourier transform (DFT) on received signals to obtain frequency domain signals; perform equalization processing on the frequency domain signals using a channel matrix, to obtain frequency domain higher-order modulation symbols and frequency domain combined guard signals; and perform inverse discrete Fourier transform (IDFT) on the frequency domain higher-order modulation symbols and the frequency domain combined guard signals, to obtain time domain higher-order modulation symbols and time domain combined guard signals. Therefore, signal combining can be implemented in frequency domain, and implementation of the receiver can be simplified.

With reference to the third or the fourth possible implementation of the first aspect, in a fifth possible implementation of the first aspect, the inserting a $t^{th}$ first guard interval in the N first guard intervals at a location following a $t^{th}$ group of higher-order modulation symbols in the N groups of higher-order modulation symbols, to obtain a $t^{th}$ to-be-sent signal includes: performing phase shift on an $i^{th}$ higher-order modulation symbol in the $t^{th}$ group of higher-order modulation symbols in the N groups of higher-order modulation symbols, to obtain a $t^{th}$ group of phase-shifted higher-order modulation symbols, where a phase shift factor of the phase shift is $$e^{j\frac{\pi}{2}i};$$

performing phase shift on an $n^{th}$ first guard signal in the $t^{th}$ first guard interval in the N first guard intervals, to obtain a $t^{th}$ phase-shifted first guard interval, where a phase shift factor of the phase shift is $$e^{j\frac{\pi}{2}n},$$

and n=1, 2, . . . , G; and inserting the $t^{th}$ phase-shifted first guard interval at a location following the $t^{th}$ group of phase-shifted higher-order modulation symbols, to obtain the $t^{th}$ to-be-sent signal.

Alternatively, it may be understood as follows. Each higher-order modulation symbol is multiplied by a phase shift factor $$e^{j\frac{\pi}{2}i}$$

corresponding to the higher-order modulation symbol, to obtain a phase-shifted higher-order modulation symbol. Each first guard signal is multiplied by a phase shift factor $$e^{j\frac{\pi}{2}n}$$

corresponding to the first guard signal, to obtain a phase-shifted first guard signal.

With reference to any one of the second to the fifth possible implementations of the first aspect, in a sixth possible implementation of the first aspect, the method further includes: determining N second guard intervals; and the inserting a $t^{th}$ first guard interval in the N first guard intervals at a location following a $t^{th}$ group of higher-order modulation symbols in the N groups of higher-order modulation symbols, to obtain a $t^{th}$ to-be-sent signal includes: inserting a $t^{th}$ second guard interval in the N second guard intervals at a location before the $t^{th}$ group of higher-order modulation symbols in the N groups of higher-order modulation symbols, and inserting the $t^{th}$ first guard interval at the location following the $t^{th}$ group of higher-order modulation symbols, to obtain the $t^{th}$ to-be-sent signal.

The second guard interval is inserted at a location before each group of higher-order modulation symbols, so that multipath interference can be further reduced.

With reference to any one of the third to the sixth possible implementations of the first aspect, in a seventh possible implementation of the first aspect, the N groups of first guard signals are the same.

It may be understood that, when the second guard interval is determined, N groups of second guard signals may be determined, where each of the N groups of second guard signals includes G second guard signals, and G is a positive integer greater than 1. A sequence formed by a $t^{th}$ group of second guard signals in the N groups of second guard signals is determined as a $t^{th}$ second guard interval in the N second guard intervals. Alternatively, when the second guard interval is determined, N groups of second guard signals may be determined, where each of the N groups of second guard signals includes G second guard signals, and G is a positive integer greater than 1. An $r^{th}$ column vector is formed using an $r^{th}$ second guard signal in each of the N groups of second guard signals. A product of the row vector of the $s^{th}$ row in the matrix Q and the $r^{th}$ column vector is determined as an $r^{th}$ second guard signal in an $s^{th}$ second guard interval in the N second guard intervals.

Optionally, the N groups of second guard signals are the same.

Optionally, the N groups of second guard signals are the same as the N groups of first guard signals.

With reference to any one of the first to the seventh possible implementations of the first aspect, in an eighth possible implementation of the first aspect, a value of N is 2, the lower-order modulation symbol is a binary phase shift keying (BPSK) symbol, and the higher-order modulation symbol is a quadrature phase shift keying (QPSK) symbol.

With reference to the first aspect, in a ninth possible implementation of the first aspect, the matrix Q is one of the following matrices:

$$Q = \frac{1}{\sqrt{2}}\begin{bmatrix} 1 & j \\ 1 & j \end{bmatrix}, Q = \frac{1}{\sqrt{2}}\begin{bmatrix} 1 & j \\ 1 & -j \end{bmatrix}, Q = \frac{1}{\sqrt{2}}\begin{bmatrix} 1 & j \\ -1 & j \end{bmatrix},$$

$$Q = \frac{1}{\sqrt{2}}\begin{bmatrix} 1 & j \\ -1 & -j \end{bmatrix}, Q = \frac{1}{\sqrt{2}}\begin{bmatrix} 1 & -j \\ 1 & j \end{bmatrix}, Q = \frac{1}{\sqrt{2}}\begin{bmatrix} 1 & -j \\ 1 & -j \end{bmatrix},$$

$$Q = \frac{1}{\sqrt{2}}\begin{bmatrix} 1 & -j \\ -1 & j \end{bmatrix}, Q = \frac{1}{\sqrt{2}}\begin{bmatrix} 1 & -j \\ -1 & -j \end{bmatrix}, Q = \frac{1}{\sqrt{2}}\begin{bmatrix} -1 & j \\ 1 & j \end{bmatrix},$$

$$Q = \frac{1}{\sqrt{2}}\begin{bmatrix} -1 & j \\ 1 & -j \end{bmatrix}, Q = \frac{1}{\sqrt{2}}\begin{bmatrix} -1 & j \\ -1 & j \end{bmatrix}, Q = \frac{1}{\sqrt{2}}\begin{bmatrix} -1 & j \\ -1 & -j \end{bmatrix},$$

$$Q = \frac{1}{\sqrt{2}}\begin{bmatrix} -1 & -j \\ 1 & j \end{bmatrix}, Q = \frac{1}{\sqrt{2}}\begin{bmatrix} -1 & -j \\ 1 & -j \end{bmatrix}, Q = \frac{1}{\sqrt{2}}\begin{bmatrix} -1 & -j \\ -1 & j \end{bmatrix},$$

and $Q = \frac{1}{\sqrt{2}}\begin{bmatrix} -1 & -j \\ -1 & -j \end{bmatrix}.$

With reference to any one of the first to the seventh possible implementations of the first aspect, in a tenth possible implementation of the first aspect, a value of N is 2, the lower-order modulation symbol is a QPSK symbol, and the higher-order modulation symbol is a 16 quadrature amplitude modulation (QAM) symbol.

With reference to the tenth possible implementation of the first aspect, in an eleventh possible implementation of the first aspect, the matrix Q is one of the following matrices:

$$Q = \frac{1}{\sqrt{5}}\begin{bmatrix} 1 & 2 \\ 1 & 2 \end{bmatrix}, Q = \frac{1}{\sqrt{5}}\begin{bmatrix} 1 & 2 \\ -1 & 2 \end{bmatrix}, Q = \frac{1}{\sqrt{5}}\begin{bmatrix} 1 & 2 \\ 2 & 1 \end{bmatrix},$$

$$Q = \frac{1}{\sqrt{5}}\begin{bmatrix} 1 & 2 \\ -2 & 1 \end{bmatrix}, Q = \frac{1}{\sqrt{5}}\begin{bmatrix} -1 & 2 \\ 1 & 2 \end{bmatrix}, Q = \frac{1}{\sqrt{5}}\begin{bmatrix} -1 & 2 \\ -1 & 2 \end{bmatrix},$$

$$Q = \frac{1}{\sqrt{5}}\begin{bmatrix} -1 & 2 \\ 2 & 1 \end{bmatrix}, Q = \frac{1}{\sqrt{5}}\begin{bmatrix} -1 & 2 \\ -2 & 1 \end{bmatrix}, Q = \frac{1}{\sqrt{5}}\begin{bmatrix} 2 & 1 \\ 1 & 2 \end{bmatrix},$$

$$Q = \frac{1}{\sqrt{5}}\begin{bmatrix} 2 & 1 \\ -1 & 2 \end{bmatrix}, Q = \frac{1}{\sqrt{5}}\begin{bmatrix} 2 & 1 \\ 2 & 1 \end{bmatrix}, Q = \frac{1}{\sqrt{5}}\begin{bmatrix} 2 & 1 \\ -2 & 1 \end{bmatrix},$$

$$Q = \frac{1}{\sqrt{5}}\begin{bmatrix} -2 & 1 \\ 1 & 2 \end{bmatrix}, Q = \frac{1}{\sqrt{5}}\begin{bmatrix} -2 & 1 \\ -1 & 2 \end{bmatrix}, Q = \frac{1}{\sqrt{5}}\begin{bmatrix} -2 & 1 \\ 2 & 1 \end{bmatrix},$$

and $Q = \frac{1}{\sqrt{5}}\begin{bmatrix} -2 & 1 \\ -2 & 1 \end{bmatrix}.$

With reference to any one of the first to the seventh possible implementations of the first aspect, in a twelfth possible implementation of the first aspect, a value of N is 2, the lower-order modulation symbol is a QPSK symbol, and the higher-order modulation symbol is a 16 amplitude phase shift keying (APSK) symbol.

With reference to the twelfth possible implementation of the first aspect, in a thirteenth possible implementation of the first aspect, the matrix Q is one of the following matrices:

$$Q = \frac{1}{\sqrt{2}}\begin{bmatrix} 1 & e^{j\theta} \\ 1 & e^{j\theta} \end{bmatrix}, Q = \frac{1}{\sqrt{2}}\begin{bmatrix} 1 & e^{j\theta} \\ 1 & -e^{j\theta} \end{bmatrix},$$

$$Q = \frac{1}{\sqrt{2}}\begin{bmatrix} 1 & e^{j\theta} \\ -1 & e^{j\theta} \end{bmatrix}, Q = \frac{1}{\sqrt{2}}\begin{bmatrix} 1 & e^{j\theta} \\ -1 & -e^{j\theta} \end{bmatrix},$$

$$Q = \frac{1}{\sqrt{2}}\begin{bmatrix} 1 & -e^{j\theta} \\ 1 & e^{j\theta} \end{bmatrix}, Q = \frac{1}{\sqrt{2}}\begin{bmatrix} 1 & -e^{j\theta} \\ 1 & -e^{j\theta} \end{bmatrix},$$

$$Q = \frac{1}{\sqrt{2}}\begin{bmatrix} 1 & -e^{j\theta} \\ -1 & e^{j\theta} \end{bmatrix}, Q = \frac{1}{\sqrt{2}}\begin{bmatrix} 1 & -e^{j\theta} \\ -1 & -e^{j\theta} \end{bmatrix},$$

$$Q = \frac{1}{\sqrt{2}}\begin{bmatrix} -1 & e^{j\theta} \\ 1 & e^{j\theta} \end{bmatrix}, Q = \frac{1}{\sqrt{2}}\begin{bmatrix} -1 & e^{j\theta} \\ 1 & -e^{j\theta} \end{bmatrix},$$

$$Q = \frac{1}{\sqrt{2}}\begin{bmatrix} -1 & e^{j\theta} \\ -1 & e^{j\theta} \end{bmatrix}, Q = \frac{1}{\sqrt{2}}\begin{bmatrix} 1 & -e^{j\theta} \\ -1 & -e^{j\theta} \end{bmatrix},$$

$$Q = \frac{1}{\sqrt{2}}\begin{bmatrix} -1 & -e^{j\theta} \\ 1 & e^{j\theta} \end{bmatrix}, Q = \frac{1}{\sqrt{2}}\begin{bmatrix} -1 & -e^{j\theta} \\ 1 & -e^{j\theta} \end{bmatrix},$$

$$Q = \frac{1}{\sqrt{2}}\begin{bmatrix} -1 & -e^{j\theta} \\ -1 & e^{j\theta} \end{bmatrix}, \text{ and } Q = \frac{1}{\sqrt{2}}\begin{bmatrix} -1 & -e^{j\theta} \\ -1 & -e^{j\theta} \end{bmatrix}.$$

With reference to the twelfth possible implementation of the first aspect, in a fourteenth possible implementation of the first aspect, the matrix Q is one of the following matrices:

$$Q = \frac{1}{\sqrt{5}}\begin{bmatrix} 1 & 2e^{j\theta} \\ 1 & 2e^{j\theta} \end{bmatrix}, Q = \frac{1}{\sqrt{5}}\begin{bmatrix} 1 & 2e^{j\theta} \\ -1 & 2e^{j\theta} \end{bmatrix},$$

$$Q = \frac{1}{\sqrt{5}}\begin{bmatrix} 1 & 2e^{j\theta} \\ 2 & e^{j\theta} \end{bmatrix}, Q = \frac{1}{\sqrt{5}}\begin{bmatrix} 1 & 2e^{j\theta} \\ -2 & e^{j\theta} \end{bmatrix},$$

$$Q = \frac{1}{\sqrt{5}}\begin{bmatrix} -1 & 2e^{j\theta} \\ 1 & 2e^{j\theta} \end{bmatrix}, Q = \frac{1}{\sqrt{5}}\begin{bmatrix} -1 & 2e^{j\theta} \\ -1 & 2e^{j\theta} \end{bmatrix},$$

$$Q = \frac{1}{\sqrt{5}}\begin{bmatrix} -1 & 2e^{j\theta} \\ 2 & e^{j\theta} \end{bmatrix}, Q = \frac{1}{\sqrt{5}}\begin{bmatrix} -1 & 2e^{j\theta} \\ -2 & e^{j\theta} \end{bmatrix},$$

$$Q = \frac{1}{\sqrt{5}}\begin{bmatrix} 2 & e^{j\theta} \\ 1 & 2e^{j\theta} \end{bmatrix}, Q = \frac{1}{\sqrt{5}}\begin{bmatrix} 2 & e^{j\theta} \\ -1 & 2e^{j\theta} \end{bmatrix},$$

$$Q = \frac{1}{\sqrt{5}}\begin{bmatrix} 2 & e^{j\theta} \\ 2 & e^{j\theta} \end{bmatrix}, Q = \frac{1}{\sqrt{5}}\begin{bmatrix} 2 & e^{j\theta} \\ -2 & e^{j\theta} \end{bmatrix},$$

$$Q = \frac{1}{\sqrt{5}}\begin{bmatrix} -2 & e^{j\theta} \\ 1 & 2e^{j\theta} \end{bmatrix}, Q = \frac{1}{\sqrt{5}}\begin{bmatrix} -2 & e^{j\theta} \\ -1 & 2e^{j\theta} \end{bmatrix},$$

$$Q = \frac{1}{\sqrt{5}}\begin{bmatrix} -2 & e^{j\theta} \\ 2 & e^{j\theta} \end{bmatrix}, \text{ and } Q = \frac{1}{\sqrt{5}}\begin{bmatrix} -2 & e^{j\theta} \\ -2 & e^{j\theta} \end{bmatrix}.$$

With reference to the thirteenth or the fourteenth possible implementation of the first aspect, in a fifteenth possible implementation of the first aspect, a value of $\theta$ is one of the following values: $\pi/4$, $3\pi/4$, $-\pi/4$, and $-3\pi/4$.

With reference to any one of the first to the seventh possible implementations of the first aspect, in a sixteenth possible implementation of the first aspect, a value of N is 3, the lower-order modulation symbol is a QPSK symbol, and the higher-order modulation symbol is a 64 quadrature amplitude modulation (QAM) symbol.

With reference to the sixteenth possible implementation of the first aspect, in a seventeenth possible implementation of the first aspect, the matrix Q is one of the following matrices:

$$Q = \frac{1}{\sqrt{21}}\begin{bmatrix} 4 & 2 & 1 \\ 1 & 4 & 2 \\ 2 & 1 & 4 \end{bmatrix}, Q = \frac{1}{\sqrt{21}}\begin{bmatrix} 4 & 2 & -1 \\ -1 & 4 & 2 \\ 2 & -1 & 4 \end{bmatrix},$$

$$Q = \frac{1}{\sqrt{21}}\begin{bmatrix} 4 & -2 & 1 \\ 1 & 4 & -2 \\ -2 & 1 & 4 \end{bmatrix}, \text{ and } Q = \frac{1}{\sqrt{21}}\begin{bmatrix} 4 & -2 & -1 \\ 1 & 4 & -2 \\ -2 & -1 & 4 \end{bmatrix}.$$

With reference to any one of the first aspect, or the first to the seventeenth possible implementations of the first aspect, in an eighteenth possible implementation of the first aspect, a bandwidth of each of the N channels is 2.16 GHz.

Optionally, a value of N is 2, the lower-order modulation symbol is a π/2 BPSK symbol, and the higher-order modulation symbol is a π/2 QPSK symbol; or a value of N is 2, the lower-order modulation symbol is a π/2 QPSK symbol, and the higher-order modulation symbol is a π/2 16QAM symbol; or a value of N is 2, the lower-order modulation symbol is a π/2 QPSK symbol, and the higher-order modulation symbol is a π/2 16APSK symbol.

Optionally, when the value of N is 2, the lower-order modulation symbol is a π/2 BPSK symbol, and the higher-order modulation symbol is a π/2 QPSK symbol, the matrix Q is one of the matrices in the ninth possible implementation of the first aspect.

Optionally, when the value of N is 2, the lower-order modulation symbol is a π/2 QPSK symbol, and the higher-order modulation symbol is a π/2 16QAM symbol, the matrix Q is one of the matrices the eleventh possible implementation of the first aspect.

Optionally, when the value of N is 2, the lower-order modulation symbol is a π/2 QPSK symbol, and the higher-order modulation symbol is a π/2 16APSK symbol, the matrix Q is one of the matrices the thirteenth possible implementation of the first aspect, or the matrix Q is one of the matrices the fourteenth possible implementation of the first aspect.

In all the foregoing possible implementations, the sending a $k^{th}$ to-be-sent signal in the N to-be-sent signals using a $k^{th}$ channel in N channels includes: converting the N to-be-sent signals into N analog signals; determining, as a $k^{th}$ radio frequency signal, a product of a $k^{th}$ analog signal in the N analog signals and a carrier signal corresponding to the $k^{th}$ channel in the N channels; and sending the $k^{th}$ radio frequency signal using the $k^{th}$ channel in the N channels.

The converting the N to-be-sent signals into N analog signals specifically includes: performing filtering processing on each to-be-sent signal, and then performing digital-to-analog (D/A) conversion on the digital signals on which filtering processing is performed, to obtain analog signals.

Optionally, during actual sending, N radio frequency signals are superimposed to obtain a superimposed radio frequency signal, and the superimposed radio frequency signal is sent.

According to a second aspect, an apparatus is provided. The apparatus is configured to perform the method in any one of the first aspect or the possible implementations of the first aspect. Specifically, the apparatus includes a unit configured to perform the method in any one of the first aspect or the possible implementations of the first aspect.

According to a third aspect, an apparatus is provided. The apparatus includes a processor, a memory, and a transmitter. The processor, the memory, and the transmitter are connected to each other using a bus. The memory is configured to store an instruction. The processor is configured to invoke the instruction stored in the memory, to control the transmitter to send information, so as to enable the apparatus to perform the method in any one of the first aspect or the possible implementations of the first aspect.

According to a fourth aspect, a computer readable medium is provided. The computer readable medium is configured to store a computer program, where the computer program includes an instruction used to perform the method in any one of the first aspect or the possible implementations of the first aspect.

DETAILED DESCRIPTION OF ILLUSTRATIVE EMBODIMENTS

Technical solutions in embodiments of this application may be applied to various suitable communications systems, for example, a Long Term Evolution (LTE) system, an LTE frequency division duplex (FDD) system, an LTE time division duplex (TDD) system, and a future network such as a 5G network, a device-to-device (D2D) system, and a machine-to-machine (M2M) system.

In the embodiments of this application, user equipment (UE) may also be referred to as terminal equipment, a mobile station (MS), a mobile terminal, and the like. The user equipment may communicate with one or more core networks through a radio access network (RAN). For example, the user equipment may be a mobile phone (also referred to as a "cellular" phone), a computer with a mobile terminal, or the like. For example, the user equipment may be a portable, pocket-sized, handheld, computer built-in, or in-vehicle mobile apparatus, a terminal device in a future 5G network, a terminal device in a future evolved public land mobile network (PLMN), or the like.

In the embodiments of this application, a base station may be an evolved NodeB (eNB or eNodeB) in a radio access network of the LTE system, or a base station in a radio access network of a future communications system. No limitation is imposed in this application.

Figure 1:
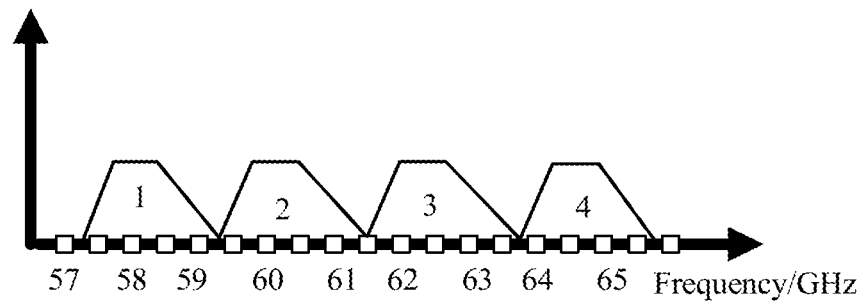
FIG. 1 is a schematic diagram of channel division according to an embodiment of this application.

It should be noted that, as shown in FIG. 1, channels in the embodiments of this application are four channels that are obtained by dividing a free frequency band of 60 GHz and that are corresponding to numbers 1, 2, 3, and 4 in FIG. 1. A bandwidth of each of the four channels is 2.16 GHz, and center frequencies corresponding to the four channels are respectively 58.320 GHz, 60.480 GHz, 62.640 GHz, and 64.800 GHz.

Figure 2:
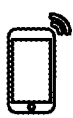
FIG. 2 is a schematic diagram of an application scenario according to an embodiment of this application.
Figure 2:
Figure 2:
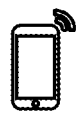
Figure 2:

FIG. 2 is a schematic diagram of an application scenario according to an embodiment of this application. As shown in FIG. 2, a base station communicates with a plurality of user equipment (UE 1 to UE 3) using a wireless signal. Usually, the wireless signal used for communication is sent and received through modulation that may be classified into single carrier modulation and multicarrier modulation.

It should be noted that, the application scenario shown in FIG. 2 shows only a case in which there is one base station (an isolated base station). However, no limitation is imposed in this application. A communications system in FIG. 2 may further include a neighboring base station that transmits a service on a same or different time-frequency resource and user equipment, and coverage of each base station may further include another quantity of user equipments.

Optionally, the communications system in which the base station and the user equipment in FIG. 2 are located may further include other network entities such as a network controller and a mobility management entity. No limitation is imposed in this embodiment of this application.

Figure 3:
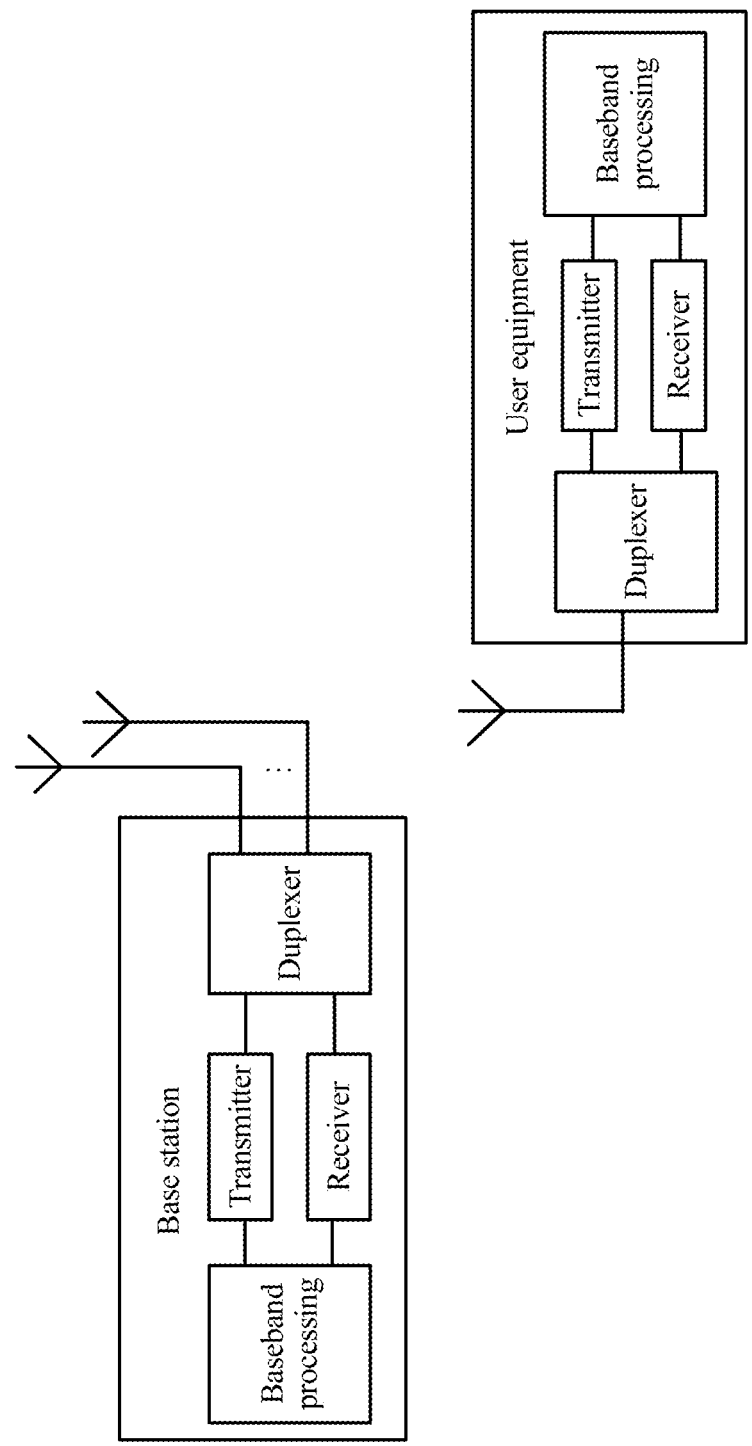
FIG. 3 is a schematic diagram of internal structures of a base station and user equipment in the application scenario in FIG. 2.

FIG. 3 is a schematic diagram of internal structures of a base station and user equipment in the application scenario shown in FIG. 2. As shown in FIG. 3, the base station may include an antenna or an antenna array, a duplexer, a transmitter (TX), a receiver (RX) (the TX and the RX may be collectively referred to as a transceiver (TRX)), and a baseband processing part. The duplexer is configured to enable the antenna or the antenna array to be used to send and receive signals. The TX is configured to implement conversion between a radio frequency signal and a baseband signal. The TX may usually include a power amplifier (PA), a digital-to-analog converter (DAC), and a frequency converter. The PA usually operates in a specific linear range. When amplitude of an input signal is significantly changed, the PA operates in a non-linear range, and consequently efficiency of the PA is reduced. The RX may usually include a low noise amplifier (LNA), an analog-to-digital converter (ADC), and a frequency converter. The baseband processing part is configured to: implement processing of a to-be-sent or received signal, such as layer mapping, precoding, modulation/demodulation, or encoding/decoding, and perform separate processing on a physical control channel, a physical data channel, a physical broadcast channel, a reference signal, and the like.

In an example, the base station may further include a control part, configured to perform multi-user scheduling and resource allocation, pilot scheduling, user physical layer parameter configuration, and the like.

The UE may include an antenna, a duplexer, a TX, an RX (the TX and the RX may be collectively referred to as a transceiver (TRX)), and a baseband processing part. As shown in FIG. 3, the UE has a single antenna. It should be understood that, the UE may alternatively have a plurality of antennas (namely, an antenna array). The duplexer enables the antenna or the antenna array to be used to send and receive signals. The TX is configured to implement conversion between a radio frequency signal and a baseband signal. The TX may usually include a PA, a DAC, and a frequency converter. Because power is supplied on a UE side using a battery, the UE is more sensitive to power amplification efficiency of the PA. The RX may usually include an LNA, an ADC, and a frequency converter. The baseband processing part is configured to: implement processing of a to-be-sent or received signal, such as layer mapping, precoding, modulation/demodulation, or encoding/decoding, and perform separate processing on a physical control channel, a physical data channel, a physical broadcast channel, a reference signal, and the like.

In an example, the UE may further include a control part, configured to: request an uplink physical resource, calculate channel state information (CSI) corresponding to a downlink channel, determine whether a downlink data packet is successfully received, and the like.

Figure 4:
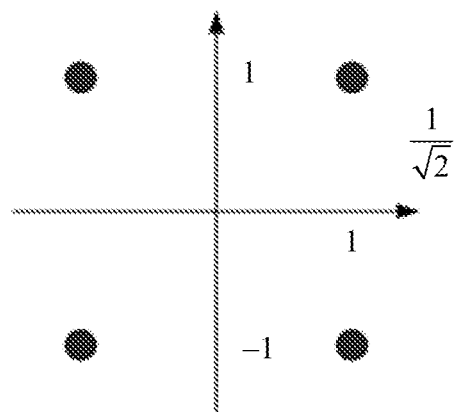
FIG. 4 is a constellation diagram of QPSK modulation.

To facilitate understanding of the embodiments of this application, a principle of combining a plurality of lower-order modulation signals into higher-order modulation signals is first described herein. As shown in FIG. 4, the following example is used: The lower-order modulation signal is a binary phase shift keying (BPSK) signal and the higher-order modulation signal is a quadrature phase shift keying (QPSK) signal. One QPSK signal may be split into a combination of two BPSK signals. It can be learned from FIG. 4 that, a value of a QPSK signal x may be the following:

$$\left\{\frac{1}{\sqrt{2}}(1+j), \frac{1}{\sqrt{2}}(1-j), \frac{1}{\sqrt{2}}(-1+j), \frac{1}{\sqrt{2}}(-1-j)\right\}.$$

The QPSK signal x may be considered as a combination of two BPSK signals $s_1$ and $s_2$, and values of $s_1$ and $s_2$ are $\{1, -1\}$. A specific combination manner is expressed as $$x = \frac{1}{\sqrt{2}}(\alpha s_1 + \beta s_2),$$

where values of $\alpha$ and $\beta$ are shown in Table 1:

TABLE 1

|  | α | β |
|---|---|---|
| Combination 1 | 1 | j |
| Combination 2 | 1 | −j |

Figure 5:
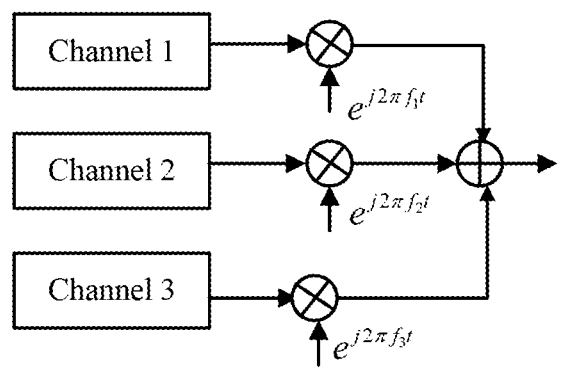
FIG. 5 is a schematic diagram of a principle of implementing channel aggregation according to an embodiment of this application.

Next, a principle of implementing channel aggregation is described. As shown in FIG. 5, three channels (channels 1, 2, and 3) are used as an example. When sending signals, a transmit end device encodes and modulates a signal on each channel, and then multiplies the signal by a corresponding carrier signal $e^{j2\pi f_n t}$, to obtain a radio frequency signal corresponding to each channel, where n=1, 2, 3, and $f_n$ is a center frequency of the channel. The transmit end device superimposes radio frequency signals from different channels, and then sends the superimposed signals.

Figure 6:
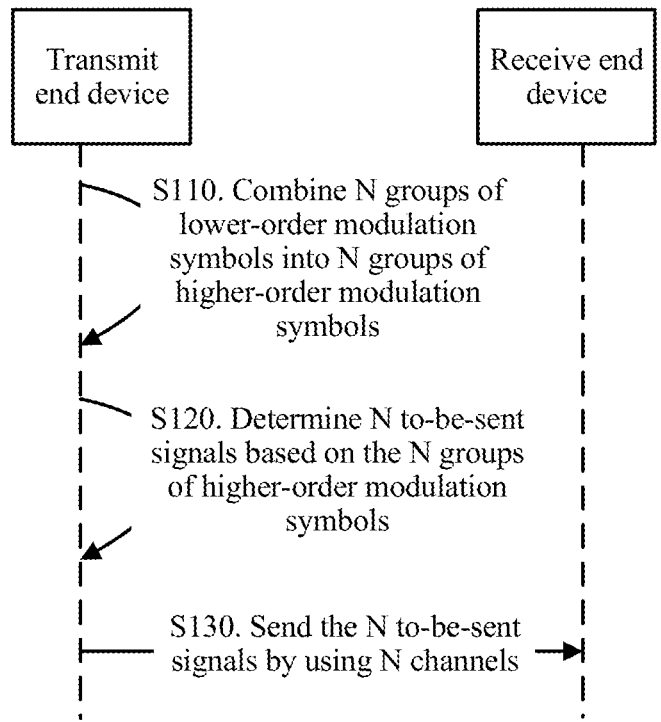
FIG. 6 is a schematic flowchart of a multichannel-based signal transmission method according to an embodiment of this application.

FIG. 6 is a schematic flowchart of a multichannel-based signal transmission method 100 according to an embodiment of this application. The method may be performed by a transmit end device, and the transmit end device may be the base station or the user equipment in the foregoing description. As shown in FIG. 6, the method 100 includes the following steps.

S110. The transmit end device combines N groups of lower-order modulation symbols into N groups of higher-order modulation symbols.

Specifically, an $i^{th}$ higher-order modulation symbol in each group of higher-order modulation symbols is obtained by combining $i^{th}$ lower-order modulation symbols in all the N groups of lower-order modulation symbols, each group of lower-order modulation symbols includes M lower-order modulation symbols, i=1, 2, . . . , M, N is a positive integer greater than 1, and M is a positive integer greater than 1.

S120. The transmit end device determines N to-be-sent signals based on the N groups of higher-order modulation symbols.

S130. The transmit end device sends the N to-be-sent signals using N channels.

Specifically, in S130, the transmit end device sends, to a receive end device, a $k^{th}$ to-be-sent signal in the N to-be-sent signals using a $k^{th}$ channel in the N channels, where k=1, 2, . . . , N.

Figure 7:
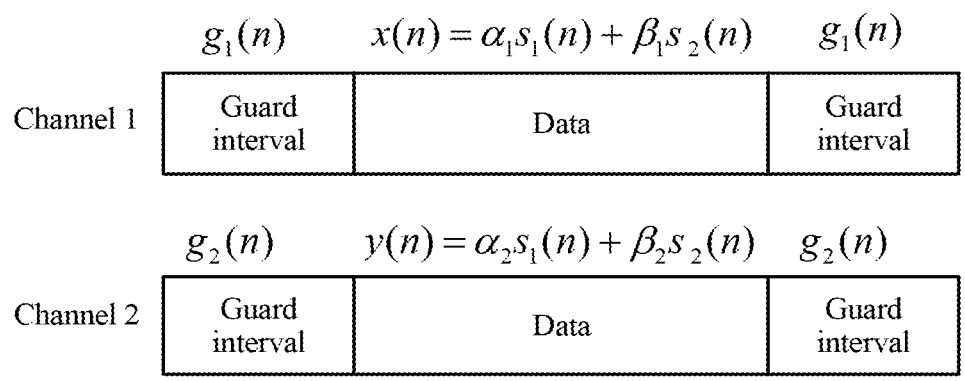
FIG. 7 is a schematic diagram of a multichannel-based signal transmission method according to a specific embodiment of this application.

The following uses an example in which a value of N is 2, to describe in detail the multichannel-based signal transmission method according to this embodiment of this application. In a process of describing this embodiment, a "modulation symbol" has a same meaning as a "modulation signal". As shown in FIG. 7, the transmit end device sends data to the receive end device using a channel 1 and a channel 2. Lower-order modulation signals to be sent by the transmit end device are expressed as $s_1(n)$ and $s_2(n)$, where n=0, 1, . . . , M−1, $s_1(n)$ may be understood as a group of lower-order modulation signals, and $s_2(n)$ may be understood as another group of lower-order modulation signals. The transmit end device determines that guard signals forming guard intervals are $g_1(n)$ and $g_2(n)$, where n=0, 1, . . . , G−1, $g_1(n)$ may be understood as a group of guard signals, and $g_2(n)$ may be understood as another group of guard signals.

When the lower-order modulation signals are combined into higher-order modulation signals, a matrix Q is multiplied by a matrix including the lower-order modulation signals $s_1(n)$ and $s_2(n)$, to obtain higher-order modulation signals x(n) and y(n). The matrix Q may be expressed as $$Q = \begin{bmatrix} \alpha_1 & \beta_1 \\ \alpha_2 & \beta_2 \end{bmatrix}.$$

Therefore, $x(n)=\alpha_1 s_1(n)+\beta_1 s_2(n)$ and $y(n)=\alpha_2 s_1(n)+\beta_2 s_2(n)$, where x(n) may be understood as a group of higher-order modulation signals, and y(n) may be understood as another group of higher-order modulation signals. Optionally, the transmit end device and the receive end device may agree on a specific form of the matrix Q in advance, or the transmit end device informs the receive end device of a specific form of the matrix Q through explicit indication.

A sequence that is formed by $g_1(n)$ and is used as a guard interval (GI) is inserted at a location following a sequence formed by x(n), to form a first digital signal. Filtering processing and digital-to-analog conversion processing are performed on the first digital signal, to obtain a first analog signal. The first analog signal is multiplied by a carrier signal $e^{j2\pi f_{c1} t}$ corresponding to a center frequency of the channel 1, to obtain a first radio frequency signal. A sequence that is formed by $g_2(n)$ and is used as a guard interval (GI) is inserted at a location following a sequence formed by y(n), to form a second digital signal. Filtering processing and digital-to-analog conversion processing are performed on the second digital signal, to obtain a second analog signal. The second analog signal is multiplied by a carrier signal $e^{j2\pi f_{c2} t}$ corresponding to a center frequency of the channel 2, to obtain a second radio frequency signal. Then, the first radio frequency signal is sent using the channel 1, and the second radio frequency signal is sent using the channel 2.

Optionally, in an example, when the first radio frequency signal and the second radio frequency signal are sent, superimposition processing may be performed on the first radio frequency signal and the second radio frequency signal, to obtain a to-be-sent radio frequency signal, and the to-be-sent radio frequency signal is sent.

Figure 8:
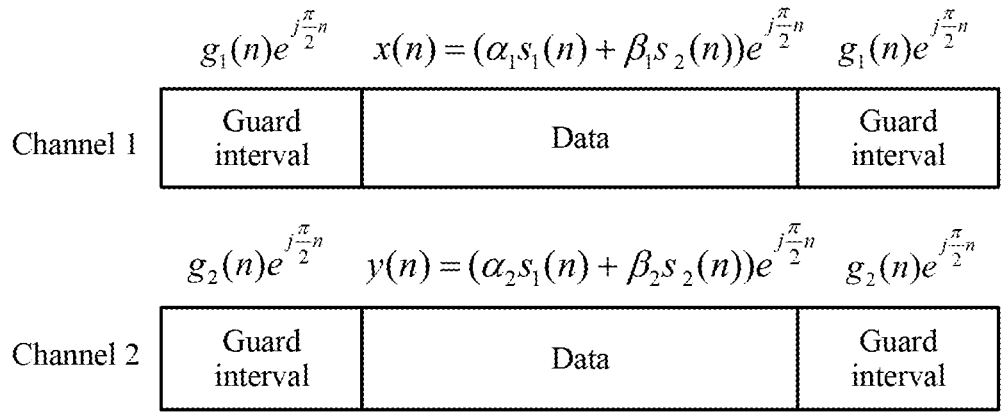
FIG. 8 is a schematic diagram of a multichannel-based signal transmission method according to another specific embodiment of this application.

Optionally, in another example, as shown in FIG. 8, before the higher-order modulation signals in the foregoing description are sent, phase shift processing is performed on the signals, where a phase shift factor is $$e^{j\frac{\pi}{2}n}.$$

Therefore, $$x(n) = (\alpha_1 s_1(n) + \beta_1 s_2(n))e^{j\frac{\pi}{2}n} \text{ and } y(n) = (\alpha_2 s_1(n) + \beta_2 s_2(n))e^{j\frac{\pi}{2}n}.$$

Phase shift processing is also performed on corresponding guard signals, and a phase shift factor is $$e^{j\frac{\pi}{2}n}.$$

Therefore, the guard signals are respectively changed to $$g_1(n)e^{j\frac{\pi}{2}n} \text{ and } g_2(n)e^{j\frac{\pi}{2}n}.$$

In an optional example, $g_1(n)=g_2(n)=g(n)$, that is, when signal transmission is performed using the channel 1 and the channel 2, a same guard interval is inserted at locations following the higher-order modulation signals.

It may be understood that, when corresponding to different lower-order modulation signals and different higher-order modulation signals, $\alpha_1$, $\beta_1$, $\alpha_2$, and have different values. Specifically, when the lower-order modulation signal is a BPSK signal and the higher-order modulation signal is a QPSK signal, or when the lower-order modulation signal is a π/2 BPSK signal and the higher-order modulation signal is a π/2 QPSK signal, the matrix Q may be specifically one of the following matrices:

$$Q = \frac{1}{\sqrt{2}}\begin{bmatrix} 1 & j \\ 1 & j \end{bmatrix}, Q = \frac{1}{\sqrt{2}}\begin{bmatrix} 1 & j \\ 1 & -j \end{bmatrix}, Q = \frac{1}{\sqrt{2}}\begin{bmatrix} 1 & j \\ -1 & j \end{bmatrix},$$

-continued $$Q = \frac{1}{\sqrt{2}}\begin{bmatrix} 1 & j \\ -1 & -j \end{bmatrix}, Q = \frac{1}{\sqrt{2}}\begin{bmatrix} 1 & -j \\ 1 & j \end{bmatrix}, Q = \frac{1}{\sqrt{2}}\begin{bmatrix} 1 & -j \\ 1 & -j \end{bmatrix},$$

$$Q = \frac{1}{\sqrt{2}}\begin{bmatrix} 1 & -j \\ -1 & j \end{bmatrix}, Q = \frac{1}{\sqrt{2}}\begin{bmatrix} 1 & -j \\ -1 & -j \end{bmatrix}, Q = \frac{1}{\sqrt{2}}\begin{bmatrix} -1 & j \\ 1 & j \end{bmatrix},$$

$$Q = \frac{1}{\sqrt{2}}\begin{bmatrix} -1 & j \\ 1 & -j \end{bmatrix}, Q = \frac{1}{\sqrt{2}}\begin{bmatrix} -1 & j \\ -1 & j \end{bmatrix}, Q = \frac{1}{\sqrt{2}}\begin{bmatrix} -1 & j \\ -1 & -j \end{bmatrix},$$

$$Q = \frac{1}{\sqrt{2}}\begin{bmatrix} -1 & -j \\ 1 & j \end{bmatrix}, Q = \frac{1}{\sqrt{2}}\begin{bmatrix} -1 & -j \\ 1 & -j \end{bmatrix}, Q = \frac{1}{\sqrt{2}}\begin{bmatrix} -1 & -j \\ -1 & j \end{bmatrix},$$

$$\text{and } Q = \frac{1}{\sqrt{2}}\begin{bmatrix} -1 & -j \\ -1 & -j \end{bmatrix}.$$

When the lower-order modulation signal is a QPSK signal and the higher-order modulation signal is a 16 quadrature amplitude modulation (QAM) signal, or when the lower-order modulation signal is a π/2 QPSK signal and the higher-order modulation signal is a π/2 16QAM signal, the matrix Q may be specifically one of the following matrices:

$$Q = \frac{1}{\sqrt{5}}\begin{bmatrix} 1 & 2 \\ 1 & 2 \end{bmatrix}, Q = \frac{1}{\sqrt{5}}\begin{bmatrix} 1 & 2 \\ -1 & 2 \end{bmatrix}, Q = \frac{1}{\sqrt{5}}\begin{bmatrix} 1 & 2 \\ 2 & 1 \end{bmatrix},$$

$$Q = \frac{1}{\sqrt{5}}\begin{bmatrix} 1 & 2 \\ -2 & 1 \end{bmatrix}, Q = \frac{1}{\sqrt{5}}\begin{bmatrix} -1 & 2 \\ 1 & 2 \end{bmatrix}, Q = \frac{1}{\sqrt{5}}\begin{bmatrix} -1 & 2 \\ -1 & 2 \end{bmatrix},$$

$$Q = \frac{1}{\sqrt{5}}\begin{bmatrix} -1 & 2 \\ 2 & 1 \end{bmatrix}, Q = \frac{1}{\sqrt{5}}\begin{bmatrix} -1 & 2 \\ -2 & 1 \end{bmatrix}, Q = \frac{1}{\sqrt{5}}\begin{bmatrix} 2 & 1 \\ 1 & 2 \end{bmatrix},$$

$$Q = \frac{1}{\sqrt{5}}\begin{bmatrix} 2 & 1 \\ -1 & 2 \end{bmatrix}, Q = \frac{1}{\sqrt{5}}\begin{bmatrix} 2 & 1 \\ 2 & 1 \end{bmatrix}, Q = \frac{1}{\sqrt{5}}\begin{bmatrix} 2 & 1 \\ -2 & 1 \end{bmatrix},$$

$$Q = \frac{1}{\sqrt{5}}\begin{bmatrix} -2 & 1 \\ 1 & 2 \end{bmatrix}, Q = \frac{1}{\sqrt{5}}\begin{bmatrix} -2 & 1 \\ -1 & 2 \end{bmatrix}, Q = \frac{1}{\sqrt{5}}\begin{bmatrix} -2 & 1 \\ 2 & 1 \end{bmatrix},$$

$$\text{and } Q = \frac{1}{\sqrt{5}}\begin{bmatrix} -2 & 1 \\ -2 & 1 \end{bmatrix}.$$

When the lower-order modulation signal is a QPSK signal and the higher-order modulation signal is a 16 amplitude phase shift keying (APSK) signal, or when the lower-order modulation signal is a π/2 QPSK signal and the higher-order modulation signal is a π/2 16APSK signal, the matrix Q may be one of the following matrices:

$$Q = \frac{1}{\sqrt{2}}\begin{bmatrix} 1 & e^{j\theta} \\ 1 & e^{j\theta} \end{bmatrix}, Q = \frac{1}{\sqrt{2}}\begin{bmatrix} 1 & e^{j\theta} \\ 1 & -e^{j\theta} \end{bmatrix}, Q = \frac{1}{\sqrt{2}}\begin{bmatrix} 1 & e^{j\theta} \\ -1 & e^{j\theta} \end{bmatrix},$$

$$Q = \frac{1}{\sqrt{2}}\begin{bmatrix} 1 & e^{j\theta} \\ -1 & -e^{j\theta} \end{bmatrix}, Q = \frac{1}{\sqrt{2}}\begin{bmatrix} 1 & -e^{j\theta} \\ 1 & e^{j\theta} \end{bmatrix}, Q = \frac{1}{\sqrt{2}}\begin{bmatrix} 1 & -e^{j\theta} \\ 1 & -e^{j\theta} \end{bmatrix},$$

$$Q = \frac{1}{\sqrt{2}}\begin{bmatrix} 1 & -e^{j\theta} \\ -1 & e^{j\theta} \end{bmatrix}, Q = \frac{1}{\sqrt{2}}\begin{bmatrix} 1 & -e^{j\theta} \\ -1 & -e^{j\theta} \end{bmatrix},$$

$$Q = \frac{1}{\sqrt{2}}\begin{bmatrix} -1 & e^{j\theta} \\ 1 & e^{j\theta} \end{bmatrix}, Q = \frac{1}{\sqrt{2}}\begin{bmatrix} -1 & e^{j\theta} \\ 1 & -e^{j\theta} \end{bmatrix},$$

$$Q = \frac{1}{\sqrt{2}}\begin{bmatrix} -1 & e^{j\theta} \\ -1 & e^{j\theta} \end{bmatrix}, Q = \frac{1}{\sqrt{2}}\begin{bmatrix} -1 & e^{j\theta} \\ -1 & -e^{j\theta} \end{bmatrix},$$

$$Q = \frac{1}{\sqrt{2}}\begin{bmatrix} -1 & -e^{j\theta} \\ 1 & e^{j\theta} \end{bmatrix}, Q = \frac{1}{\sqrt{2}}\begin{bmatrix} -1 & -e^{j\theta} \\ 1 & -e^{j\theta} \end{bmatrix},$$

$$Q = \frac{1}{\sqrt{2}}\begin{bmatrix} -1 & -e^{j\theta} \\ -1 & e^{j\theta} \end{bmatrix}, \text{ and } Q = \frac{1}{\sqrt{2}}\begin{bmatrix} -1 & -e^{j\theta} \\ -1 & -e^{j\theta} \end{bmatrix}.$$

When the lower-order modulation signal is a QPSK signal and the higher-order modulation signal is a 16APSK signal, or when the lower-order modulation signal is a π/2 QPSK signal and the higher-order modulation signal is a π/2 16APSK signal, the matrix Q may be one of the following matrices:

$$Q = \frac{1}{\sqrt{5}}\begin{bmatrix} 1 & 2e^{j\theta} \\ 1 & 2e^{j\theta} \end{bmatrix}, Q = \frac{1}{\sqrt{5}}\begin{bmatrix} 1 & 2e^{j\theta} \\ -1 & 2e^{j\theta} \end{bmatrix},$$

$$Q = \frac{1}{\sqrt{5}}\begin{bmatrix} 1 & 2e^{j\theta} \\ 2 & e^{j\theta} \end{bmatrix}, Q = \frac{1}{\sqrt{5}}\begin{bmatrix} 1 & 2e^{j\theta} \\ -2 & e^{j\theta} \end{bmatrix},$$

$$Q = \frac{1}{\sqrt{5}}\begin{bmatrix} -1 & 2e^{j\theta} \\ 1 & 2e^{j\theta} \end{bmatrix}, Q = \frac{1}{\sqrt{5}}\begin{bmatrix} -1 & 2e^{j\theta} \\ -1 & 2e^{j\theta} \end{bmatrix},$$

$$Q = \frac{1}{\sqrt{5}}\begin{bmatrix} -1 & 2e^{j\theta} \\ 2 & e^{j\theta} \end{bmatrix}, Q = \frac{1}{\sqrt{5}}\begin{bmatrix} -1 & 2e^{j\theta} \\ -2 & e^{j\theta} \end{bmatrix},$$

$$Q = \frac{1}{\sqrt{5}}\begin{bmatrix} 2 & e^{j\theta} \\ 1 & 2e^{j\theta} \end{bmatrix}, Q = \frac{1}{\sqrt{5}}\begin{bmatrix} 2 & e^{j\theta} \\ -1 & 2e^{j\theta} \end{bmatrix},$$

$$Q = \frac{1}{\sqrt{5}}\begin{bmatrix} 2 & e^{j\theta} \\ 2 & e^{j\theta} \end{bmatrix}, Q = \frac{1}{\sqrt{5}}\begin{bmatrix} 2 & e^{j\theta} \\ -2 & e^{j\theta} \end{bmatrix},$$

$$Q = \frac{1}{\sqrt{5}}\begin{bmatrix} -2 & e^{j\theta} \\ 1 & 2e^{j\theta} \end{bmatrix}, Q = \frac{1}{\sqrt{5}}\begin{bmatrix} -2 & e^{j\theta} \\ -1 & 2e^{j\theta} \end{bmatrix},$$

$$Q = \frac{1}{\sqrt{5}}\begin{bmatrix} -2 & e^{j\theta} \\ 2 & e^{j\theta} \end{bmatrix}, \text{ and } Q = \frac{1}{\sqrt{5}}\begin{bmatrix} -2 & e^{j\theta} \\ -2 & e^{j\theta} \end{bmatrix}.$$

In the foregoing embodiment, optionally, a value of θ is one of the following values: π/4, 3π/4, −π/4, and −3π/4.

Correspondingly, after receiving the radio frequency signals sent by the transmit end device, the receive end device performs discrete Fourier transform (DFT) on the higher-order modulation signals and the GI parts following the higher-order modulation signals, to obtain formula (1):

$$\begin{bmatrix} r_{f1}(n) \\ r_{f2}(n) \end{bmatrix} = \underbrace{\begin{bmatrix} h_{f1}(n) & 0 \\ 0 & h_{f2}(n) \end{bmatrix}}_{H_f(n)} \left( \begin{bmatrix} x_f(n) \\ y_f(n) \end{bmatrix} + \begin{bmatrix} g_{f1}(n) \\ g_{f2}(n) \end{bmatrix} \right) \quad (1)$$

where $r_{f1}(n)$ and $r_{f2}(n)$ respectively represent frequency domain signals received by the receive end device on a subcarrier n on the channel 1 and the channel 2, $h_{f1}(n)$ and $h_{f2}(n)$ respectively represent corresponding frequency domain signal responses on the subcarrier n on the channel 1 and the channel 2, $x_f(n)$ and $y_f(n)$ are respectively frequency domain signals on the subcarrier n that correspond to $\tilde{x}(n)$ and $\tilde{y}(n)$, $g_{f1}(n)$ and $g_{f2}(n)$ are respectively frequency domain signals on the subcarrier n that correspond to $\tilde{g}_1(n)$ and $\tilde{g}_2(n)$, $\tilde{x}(n)$, $\tilde{y}(n)$, $\tilde{g}_1(n)$, and $\tilde{g}_2(n)$ are respectively represented by formulas (2) to (5), and n in formulas (2) to (5) represents a subcarrier sequence number:

$$\tilde{x}(n) = \begin{cases} \alpha_1 s_1(n) + \beta_1 s_2(n), n = 0, \ldots M-1 \\ 0, n = M, \ldots M+G-1 \end{cases} \quad (2)$$

$$\tilde{y}(n) = \begin{cases} \alpha_2 s_1(n) + \beta_2 s_2(n), n = 0, \ldots M-1 \\ 0, n = M, \ldots M+G-1 \end{cases} \quad (3)$$

where $g_{f1}(n)$ and $g_{f2}(n)$ are respectively frequency domain signals on the subcarrier n that correspond to $\tilde{g}^1(n)$ and $\tilde{g}^2(n)$:

$$\tilde{g}_1(n) = \begin{cases} 0, n = 0, \ldots M-1 \\ g_1(n), n = M, \ldots M+G-1 \end{cases} \quad (4)$$

$$\tilde{g}_2(n) = \begin{cases} 0, n = 0, \ldots M-1 \\ g_2(n), n = M, \ldots M+G-1 \end{cases} \quad (5)$$

Formula (6) may be obtained by performing channel equalization on formula (1):

$$\begin{bmatrix} x_f(n) \\ y_f(n) \end{bmatrix} + \begin{bmatrix} g_{f1}(n) \\ g_{f2}(n) \end{bmatrix} = H_f^{-1}(n) \begin{bmatrix} r_{f1}(n) \\ r_{f2}(n) \end{bmatrix} \quad (6)$$

Inverse discrete Fourier transform (IDFT) is performed on a result of formula (6), to obtain $\hat{x}(n)$, $\hat{y}(n)$, $\tilde{g}_1(n)$, and $\tilde{g}_2(n)$. Signal combining is performed on $\hat{x}(n)$ and $\hat{y}(n)$, to obtain $s_1(n)$ and $s_2(n)$. For details, refer to formula (7):

$$\begin{bmatrix} s_1(n) \\ s_2(n) \end{bmatrix} = Q^{-1} \begin{bmatrix} \hat{x}(n) \\ \hat{y}(n) \end{bmatrix}, \text{ where } n = 0, 1, \ldots, M-1 \quad (7)$$

In this embodiment of this application, optionally, the guard signals $g_1(n)$ and $g_2(n)$ are combined into guard signals $\tilde{g}_1(n)$ and $\tilde{g}_2(n)$. A specific implementation is similar to the foregoing description, that is, the matrix Q is multiplied by the guard signals $g_1(n)$ and $g_2(n)$. For details, refer to formula (8):

$$\begin{bmatrix} \tilde{g}_1(n) \\ \tilde{g}_2(n) \end{bmatrix} = \underbrace{\begin{bmatrix} \alpha_1 & \beta_1 \\ \alpha_2 & \beta_2 \end{bmatrix}}_{Q} \begin{bmatrix} g_1(n) \\ g_2(n) \end{bmatrix} \quad (8)$$

Correspondingly, when sending signals, the transmit end device inserts, at a location following a sequence formed by $x(n)$, a sequence that is formed by $\tilde{g}_1(n)$ and is used as a GI, to form a first digital signal; performs filtering processing and digital-to-analog conversion processing on the first digital signal, to obtain a first analog signal; and multiplies the first analog signal by a carrier signal $e^{j2\pi f_{c1}t}$ corresponding to a center frequency of the channel 1, to obtain a first radio frequency signal. The transmit end device inserts, at a location following a sequence formed by $y(n)$, a sequence that is formed by $\tilde{g}_2(n)$ and is used as a GI, to form a second digital signal; performs filtering processing and digital-to-analog conversion processing on the second digital signal, to obtain a second analog signal; and multiplies the second analog signal by a carrier signal $e^{j2\pi f_{c2}t}$ corresponding to a center frequency of the channel 2, to obtain a second radio frequency signal. The transmit end device sends the first radio frequency signal using the channel 1, and sends the second radio frequency signal using the channel 2.

Further, after receiving the radio frequency signals sent by the transmit end device, the receive end device performs DFT on the higher-order modulation signals and the GI parts following the higher-order modulation signals, to obtain formula (9):

$$\begin{bmatrix} r_{f1}(n) \\ r_{f2}(n) \end{bmatrix} = \underbrace{\begin{bmatrix} h_{f1}(n) & 0 \\ 0 & h_{f2}(n) \end{bmatrix}}_{H_f(n)} \begin{bmatrix} \alpha_1 & \beta_1 \\ \alpha_2 & \beta_2 \end{bmatrix} \left( \begin{bmatrix} s_{f1}(n) \\ s_{f2}(n) \end{bmatrix} + \begin{bmatrix} g_{f1}(n) \\ g_{f2}(n) \end{bmatrix} \right) \quad (9)$$

Formula (w) may be obtained by performing channel equalization on formula (9):

$$\begin{bmatrix} \hat{r}_{f1}(n) \\ \hat{r}_{f2}(n) \end{bmatrix} = \begin{bmatrix} s_{f1}(n) \\ s_{f2}(n) \end{bmatrix} + \begin{bmatrix} g_{f1}(n) \\ g_{f2}(n) \end{bmatrix} = H_f^{-1}(n) \begin{bmatrix} r_{f1}(n) \\ r_{f2}(n) \end{bmatrix} \quad (10)$$

Using $H_f(n)$ in frequency domain may calculate $s_{f1}(n)$, $s_{f2}(n)$, $g_{f1}(n)$, and $g_{f2}(n)$ together, where $s_{f1}(n)$ and $s_{f2}(n)$ are respectively frequency domain signals corresponding to $\tilde{s}_1(n)$ and $\tilde{s}_2(n)$, $g_{f1}(n)$ and $g_{f2}(n)$ are respectively frequency domain signals corresponding to $\tilde{g}_1(n)$ and $\tilde{g}_2(n)$, and $\tilde{s}_1(n)$, $\tilde{s}_2(n)$, $\tilde{g}_1(n)$, and $\tilde{g}_2(n)$ are respectively represented by formulas (11) to (14):

$$\tilde{s}_1(n) = \begin{cases} s_1(n), n = 0, \ldots M-1 \\ 0, n = M, \ldots M+G-1 \end{cases} \quad (11)$$

$$\tilde{s}_2(n) = \begin{cases} s_2(n), n = 0, \ldots M-1 \\ 0, n = M, \ldots M+G-1 \end{cases} \quad (12)$$

$$\tilde{g}_1(n) = \begin{cases} 0, n = 0, \ldots M-1 \\ g_1(n), n = M, \ldots M+G-1 \end{cases} \quad (13)$$

$$\tilde{g}_2(n) = \begin{cases} 0, n = 0, \ldots M-1 \\ g_2(n), n = M, \ldots M+G-1 \end{cases} \quad (14)$$

IDFT is performed on the frequency domain signals $\hat{r}_{f1}(n)$ and $\hat{r}_{f2}(n)$ obtained through equalization, to obtain $\tilde{s}_1(n)$, $\tilde{s}_2(n)$, $\tilde{g}_1(n)$, and $\tilde{g}_2(n)$. The first M signals of each of $\tilde{s}_1(n)$ and $\tilde{s}_2(n)$ are taken, to obtain $s_1(n)$ and $s_2(n)$.

Optionally, in the foregoing optional embodiments, a guard interval formed by a guard sequence is inserted at the location before each of the sequence formed by $x(n)$ and the sequence formed by $y(n)$. Further, the guard sequences may be combined using the method in the foregoing embodiment, to obtain combined guard sequences, and each group of combined guard sequences forms a guard interval. Further, the guard intervals inserted at the locations before the sequence formed by $x(n)$ and the sequence formed by $y(n)$ are the same. Therefore, multipath interference in a signal transmission process can be reduced.

In this embodiment of this application, optionally, when the value of N is 3, the lower-order modulation signal is a QPSK signal, and the higher-order modulation signal is a 64QAM signal, the matrix Q may be one of the following matrices:

$$Q = \frac{1}{\sqrt{21}}\begin{bmatrix} 4 & 2 & 1 \\ 1 & 4 & 2 \\ 2 & 1 & 4 \end{bmatrix}, Q = \frac{1}{\sqrt{21}}\begin{bmatrix} 4 & 2 & -1 \\ -1 & 4 & 2 \\ 2 & -1 & 4 \end{bmatrix},$$

$$Q = \frac{1}{\sqrt{21}}\begin{bmatrix} 4 & -2 & 1 \\ 1 & 4 & -2 \\ -2 & 1 & 4 \end{bmatrix}, \text{and } Q = \frac{1}{\sqrt{21}}\begin{bmatrix} 4 & -2 & -1 \\ 1 & 4 & -2 \\ -2 & -1 & 4 \end{bmatrix}.$$

Figure 9:
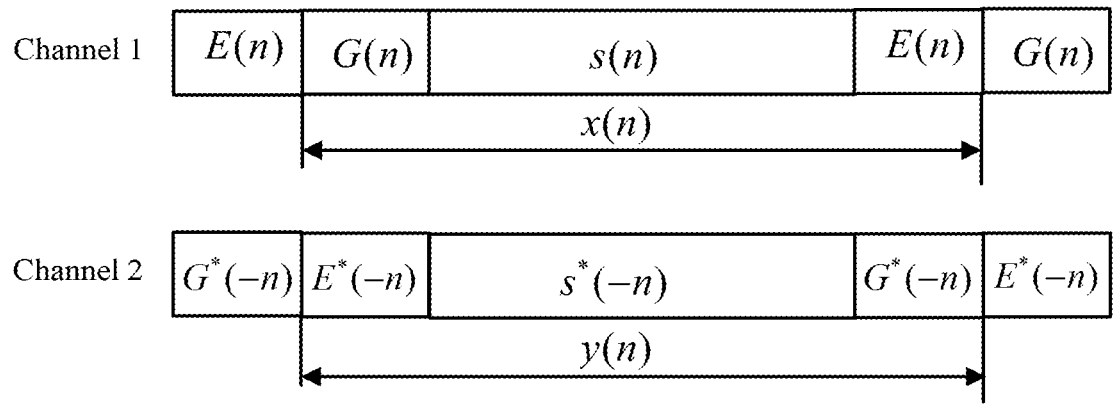
FIG. 9 is a schematic diagram of a multichannel-based signal transmission method according to still another specific embodiment of this application.

In this embodiment of this application, optionally, as shown in FIG. 9, when the transmit end device sends signals using two channels (the channel 1 and the channel 2), it is assumed that to-be-sent signals are $s_1, s_2, \ldots, s_M$. The M signals form a sequence $s(n)=[s_1, s_2, \ldots s_M]$ and a sequence $s^*(-n)=[s^*_M, s^*_{M-1}, \ldots s^*_1]$. It is known that signals $g_1, g_2, \ldots, g_G$ and signals $e_1, e_2, \ldots, e_E$ form four sequences that are used to fill guard intervals and are respectively as follows:

$G(n)=[g_1,g_2, \ldots g_{G-1},g_G], E(n)=[e_1,e_2, \ldots e_{E-1},e_E],$
$G^*(-n)=[g^*_G,g^*_{G-1}, \ldots g^*_1],$ and $E^*(-n)=[e^*_E, e^*_{E-1}, \ldots e^*_2,e^*_1].$ A signal x(n) sent by the transmit end device on the channel 1 is formed using the following sequences: G(n), s(n), and E(n). Further, as shown in FIG. 9, E(n) is inserted at a location before the signal x(n), and G(n) is inserted at a location after the signal x(n). A signal y(n) sent by the transmit end device on the channel 2 is formed using the following sequences: $G^*(-n)$, $s^*(-n)$, and $E^*(-n)$. Further, as shown in FIG. 9, $G^*(-n)$ is inserted at a location before the signal y(n), and $E^*(-n)$ is inserted at a location after the signal y(n). Therefore, multipath interference can be further reduced.

Correspondingly, after receiving the signals sent using the channel 1 and the channel 2, the receive end device performs DFT on the received signal x(n) on the channel 1 and the received signal y(n) on the channel 2, to obtain frequency domain signals that are shown in formula (15):

$$\begin{cases} r_{f_1}(n) = h_{f_1}(n) x_f(n) \\ r_{f_2}(n) = h_{f_2}(n) y_f(n) = h_{f_2}(n) e^{j\frac{2\pi}{M+G+E}n} x_f^*(n) \end{cases} \quad (15)$$

where $r_{f1}(n)$ and $r_{f2}(n)$ respectively represent frequency domain signals received by the receive end device on a subcarrier n on the channel 1 and the channel 2, $h_{f1}(n)$ and $h_{f2}(n)$ respectively represent corresponding frequency domain signal responses on the subcarrier n on the channel 1 and the channel 2, $x_f(n)$ and $y_f(n)$ are respectively frequency domain signals on the subcarrier n that are corresponding to x(n) and y(n), n is a subcarrier sequence number, and n=0, 1, . . . , (G+E+M−1).

Then, the receive end device performs maximum ratio combining on the received signals $r_{f1}(n)$ and $r_{f2}(n)$, to obtain $x_f(n)$, and transforms $x_f(n)$ to a time domain to obtain s(n), g(n), and e(n).

Figure 10:
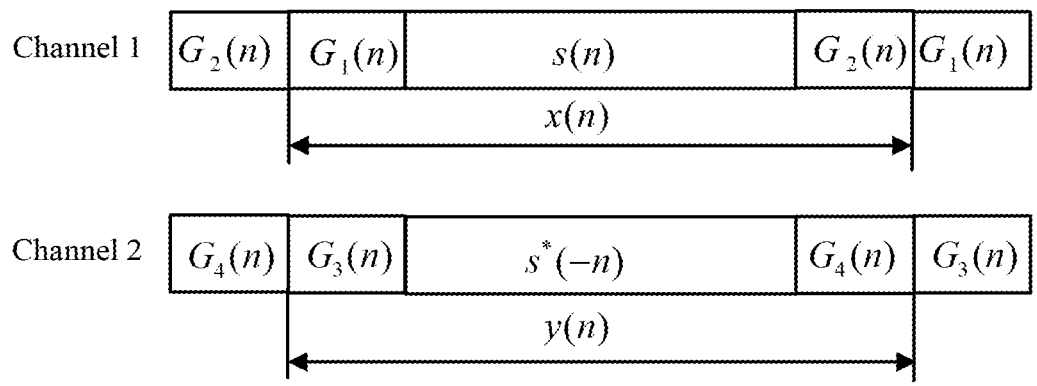
FIG. 10 is a schematic diagram of a multichannel-based signal transmission method according to still another specific embodiment of this application.

In this embodiment of this application, optionally, as shown in FIG. 10, when the transmit end device sends signals using two channels (the channel 1 and the channel 2), it is assumed that to-be-sent signals are $s_1, s_2, \ldots s_M$. The M signals form a sequence $s(n)=[s_1, s_2, \ldots s_M]$ and a sequence $[s^*_M, \ldots s^*_2, s^*_1]$. It is known that signals $g_1, g_2, \ldots, g_G$ and signals $e_1, e_2, \ldots, e_E$ form four sequences that are used to fill guard intervals and are respectively as follows:

$G_1(n)=[g_1,g_2, \ldots g_{G-1},g_G], G_2(n)=[e_1,e_2, \ldots e_E], G_3^*(n)=[e^*_E,e^*_{E-1}, \ldots e^*_2,e^*_1],$ and $G_4^*(n)=[g^*_G, g^*_{G-1}, \ldots g^*_1].$ A signal x(n) sent by the transmit end device on the channel 1 is formed using the following sequences: $G_1(n)$, s(n), and $G_2(n)$. Further, as shown in FIG. 10, $G_2(n)$ is inserted at a location before the signal x(n), and $G_1(n)$ is inserted at a location after the signal x(n). A signal y(n) sent by the transmit end device on the channel 2 is formed using the following sequences: $G_3(n)$, $s^*(-n)$, and $G_4(n)$. Further, as shown in FIG. 10, $G_4(n)$ is inserted at a location before the signal y(n), and $G_3(n)$ is inserted at a location after the signal y(n). Therefore, multipath interference can be further reduced.

Correspondingly, after receiving the signals sent using the channel 1 and the channel 2, the receive end device performs DFT on the received signal x(n) on the channel 1 and the received signal y(n) on the channel 2, to obtain frequency domain signals that are shown in formula (16):

$$\begin{cases} r_{f_1}(n) = h_{f_1}(n) x_f(n) \\ r_{f_2}(n) = h_{f_2}(n) y_f(n) = h_{f_2}(n) x_f^*(n) \end{cases} \quad (16)$$

where $r_{f1}(n)$ and $r_{f2}(n)$ respectively represent frequency domain signals received by the receive end device on a subcarrier n on the channel 1 and the channel 2, $h_{f1}(n)$ and $h_{f2}(n)$ respectively represent corresponding frequency domain signal responses on the subcarrier n on the channel 1 and the channel 2, $x_f(n)$ and $y_f(n)$ are respectively frequency domain signals on the subcarrier n that correspond to x(n) and y(n), n is a subcarrier sequence number, and n=0, 1, . . . , (G+E+M−1).

Then, the receive end device performs maximum ratio combining on the received signals $r_{f1}(n)$ and $r_{f2}(n)$, to obtain $x_f(n)$, and transforms $x_f(n)$ to a time domain to obtain s(n), g(n).

Figure 11:
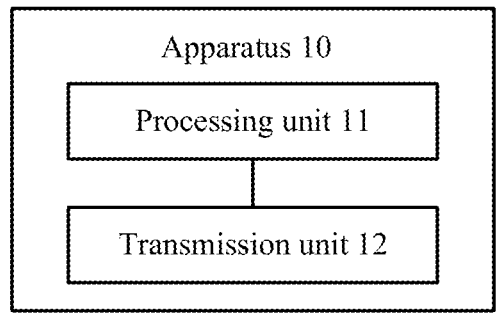
FIG. 11 is a schematic block diagram of a multichannel-based signal transmission apparatus according to an embodiment of this application.

With reference to FIG. 6 to FIG. 10, the foregoing describes in detail the multichannel-based signal transmission method according to the embodiments of this application. With reference to FIG. 11, the following describes in detail a multichannel-based signal transmission apparatus according to the embodiments of this application.

FIG. 11 shows a multichannel-based signal transmission apparatus according to an embodiment of this application. As shown in FIG. 11, an apparatus 10 includes: a processing unit 11, configured to combine N groups of lower-order modulation symbols into N groups of higher-order modulation symbols, where an $i^{th}$ higher-order modulation symbol in each group of higher-order modulation symbols is obtained by combining $i^{th}$ lower-order modulation symbols in all the N groups of lower-order modulation symbols, each group of lower-order modulation symbols includes M lower-order modulation symbols, i=1, 2, . . . , M, N is a positive integer greater than 1, and M is a positive integer greater than 1, where the processing unit 11 is further configured to determine N to-be-sent signals based on the N groups of higher-order modulation symbols. The apparatus 10 also includes a transmission unit 12, configured to send a $k^{th}$ to-be-sent signal in the N to-be-sent signals using a $k^{th}$ channel in N channels, where k=1, 2, . . . , N.

Therefore, according to the multichannel-based signal transmission apparatus in this embodiment of this application, a plurality of groups of lower-order modulation symbols are combined into a plurality of groups of higher-order modulation symbols, a plurality of to-be-sent signals are generated based on the plurality of groups of higher-order modulation symbols, and the plurality of to-be-sent signals are sent using a plurality of channels. In this way, one lower-order modulation symbol can be transmitted on a plurality of channels, signal diversity transmission is implemented, and signal transmission reliability is improved.

In this embodiment of this application, optionally, when combining the N groups of lower-order modulation symbols into the N groups of higher-order modulation symbols, the processing unit 11 is specifically configured to: form an $i^{th}$ column vector using the $i^{th}$ lower-order modulation symbol in each of the N groups of lower-order modulation symbols; and determine a product of a row vector of an $s^{th}$ row in a matrix Q and the $i^{th}$ column vector as an $i^{th}$ higher-order modulation symbol in an $s^{th}$ group of higher-order modulation symbols in the N groups of higher-order modulation symbols, where s=1, 2, . . . , N.

In this embodiment of this application, optionally, when determining the N to-be-sent signals based on the N groups of higher-order modulation symbols, the processing unit 11 is specifically configured to: determine N first guard intervals; and insert a $t^{th}$ first guard interval in the N first guard intervals at a location following a $t^{th}$ group of higher-order modulation symbols in the N groups of higher-order modulation symbols, to obtain a $t^{th}$ to-be-sent signal, where t=1, 2, . . . , N.

In this embodiment of this application, optionally, when determining the N first guard intervals, the processing unit 11 is specifically configured to: determine N groups of first guard signals, where each of the N groups of first guard signals includes G first guard signals, and G is a positive integer greater than 1; and determine a sequence formed by a $t^{th}$ group of first guard signals in the N groups of first guard signals as the $t^{th}$ first guard interval in the N first guard intervals.

In this embodiment of this application, optionally, when determining the N first guard intervals, the processing unit 11 is specifically configured to: determine N groups of first guard signals, where each of the N groups of first guard signals includes G first guard signals, and G is a positive integer greater than 1; form an $r^{th}$ column vector using an $r^{th}$ first guard signal in each of the N groups of first guard signals, where r=1, 2, . . . , G; and determine a product of the row vector of the $s^{th}$ row in the matrix Q and the $r^{th}$ column vector as an $r^{th}$ first guard signal in an $s^{th}$ first guard interval in the N first guard intervals.

In this embodiment of this application, optionally, when inserting the $t^{th}$ first guard interval in the N first guard intervals at the location following the $t^{th}$ group of higher-order modulation symbols in the N groups of higher-order modulation symbols, to obtain the $t^{th}$ to-be-sent signal, the processing unit 11 is specifically configured to: perform phase shift on an $i^{th}$ higher-order modulation symbol in the $t^{th}$ group of higher-order modulation symbols in the N groups of higher-order modulation symbols, to obtain a $t^{th}$ group of phase-shifted higher-order modulation symbols, where a phase shift factor of the phase shift is e $$e^{j\frac{\pi}{2}i};$$

perform phase shift on an $n^{th}$ first guard signal in the $t^{th}$ first guard interval in the N first guard intervals, to obtain a $t^{th}$ phase-shifted first guard interval, where a phase shift factor of the phase shift is e $$e^{j\frac{\pi}{2}n},$$

and n=1, 2, . . . , G; and insert the $t^{th}$ phase-shifted first guard interval at a location following the $t^{th}$ group of phase-shifted higher-order modulation symbols, to obtain the $t^{th}$ to-be-sent signal.

In this embodiment of this application, optionally, the processing unit 11 is further configured to determine N second guard intervals.

When inserting the $t^{th}$ first guard interval in the N first guard intervals at the location following the $t^{th}$ group of higher-order modulation symbols in the N groups of higher-order modulation symbols, to obtain the $t^{th}$ to-be-sent signal, the processing unit 11 is specifically configured to: insert a $t^{th}$ second guard interval in the N second guard intervals at a location before the $t^{th}$ group of higher-order modulation symbols in the N groups of higher-order modulation symbols, and insert the $t^{th}$ first guard interval at the location following the $t^{th}$ group of higher-order modulation symbols, to obtain the $t^{th}$ to-be-sent signal.

In this embodiment of this application, optionally, the N groups of first guard signals are the same.

In this embodiment of this application, optionally, a value of N is 2, the lower-order modulation symbol is a binary phase shift keying (BPSK) symbol, and the higher-order modulation symbol is a quadrature phase shift keying (QPSK) symbol.

In this embodiment of this application, optionally, the matrix Q is one of the following matrices:

$$Q = \frac{1}{\sqrt{2}}\begin{bmatrix} 1 & j \\ 1 & j \end{bmatrix}, Q = \frac{1}{\sqrt{2}}\begin{bmatrix} 1 & j \\ 1 & -j \end{bmatrix}, Q = \frac{1}{\sqrt{2}}\begin{bmatrix} 1 & j \\ -1 & j \end{bmatrix},$$

$$Q = \frac{1}{\sqrt{2}}\begin{bmatrix} 1 & j \\ -1 & -j \end{bmatrix}, Q = \frac{1}{\sqrt{2}}\begin{bmatrix} 1 & -j \\ 1 & j \end{bmatrix}, Q = \frac{1}{\sqrt{2}}\begin{bmatrix} 1 & -j \\ 1 & -j \end{bmatrix},$$

$$Q = \frac{1}{\sqrt{2}}\begin{bmatrix} 1 & -j \\ -1 & j \end{bmatrix}, Q = \frac{1}{\sqrt{2}}\begin{bmatrix} 1 & -j \\ -1 & -j \end{bmatrix}, Q = \frac{1}{\sqrt{2}}\begin{bmatrix} -1 & j \\ 1 & j \end{bmatrix},$$

$$Q = \frac{1}{\sqrt{2}}\begin{bmatrix} -1 & j \\ 1 & -j \end{bmatrix}, Q = \frac{1}{\sqrt{2}}\begin{bmatrix} -1 & j \\ -1 & j \end{bmatrix}, Q = \frac{1}{\sqrt{2}}\begin{bmatrix} -1 & j \\ -1 & -j \end{bmatrix},$$

$$Q = \frac{1}{\sqrt{2}}\begin{bmatrix} -1 & -j \\ 1 & j \end{bmatrix}, Q = \frac{1}{\sqrt{2}}\begin{bmatrix} -1 & -j \\ 1 & -j \end{bmatrix}, Q = \frac{1}{\sqrt{2}}\begin{bmatrix} -1 & -j \\ -1 & j \end{bmatrix},$$

and $Q = \frac{1}{\sqrt{2}}\begin{bmatrix} -1 & -j \\ -1 & -j \end{bmatrix}.$

In this embodiment of this application, optionally, a value of N is 2, the lower-order modulation symbol is a QPSK symbol, and the higher-order modulation symbol is a 16 quadrature amplitude modulation QAM symbol.

In this embodiment of this application, optionally, the matrix Q is one of the following matrices:

$$Q = \frac{1}{\sqrt{5}}\begin{bmatrix} 1 & 2 \\ 1 & 2 \end{bmatrix}, Q = \frac{1}{\sqrt{5}}\begin{bmatrix} 1 & 2 \\ -1 & 2 \end{bmatrix}, Q = \frac{1}{\sqrt{5}}\begin{bmatrix} 1 & 2 \\ 2 & 1 \end{bmatrix},$$

$$Q = \frac{1}{\sqrt{5}}\begin{bmatrix} 1 & 2 \\ -2 & 1 \end{bmatrix}, Q = \frac{1}{\sqrt{5}}\begin{bmatrix} -1 & 2 \\ 1 & 2 \end{bmatrix}, Q = \frac{1}{\sqrt{5}}\begin{bmatrix} -1 & 2 \\ -1 & 2 \end{bmatrix},$$

$$Q = \frac{1}{\sqrt{5}}\begin{bmatrix} -1 & 2 \\ 2 & 1 \end{bmatrix}, Q = \frac{1}{\sqrt{5}}\begin{bmatrix} -1 & 2 \\ -2 & 1 \end{bmatrix}, Q = \frac{1}{\sqrt{5}}\begin{bmatrix} 2 & 1 \\ 1 & 2 \end{bmatrix},$$

-continued $$Q = \frac{1}{\sqrt{5}}\begin{bmatrix} 2 & 1 \\ -1 & 2 \end{bmatrix}, Q = \frac{1}{\sqrt{5}}\begin{bmatrix} 2 & 1 \\ 2 & 1 \end{bmatrix}, Q = \frac{1}{\sqrt{5}}\begin{bmatrix} 2 & 1 \\ -2 & 1 \end{bmatrix},$$

$$Q = \frac{1}{\sqrt{5}}\begin{bmatrix} -2 & 1 \\ 1 & 2 \end{bmatrix}, Q = \frac{1}{\sqrt{5}}\begin{bmatrix} -2 & 1 \\ -1 & 2 \end{bmatrix}, Q = \frac{1}{\sqrt{5}}\begin{bmatrix} -2 & 1 \\ 2 & 1 \end{bmatrix},$$

$$\text{and } Q = \frac{1}{\sqrt{5}}\begin{bmatrix} -2 & 1 \\ -2 & 1 \end{bmatrix}.$$

In this embodiment of this application, optionally, a value of N is 2, the lower-order modulation symbol is a QPSK symbol, and the higher-order modulation symbol is a 16 amplitude phase shift keying APSK symbol.

In this embodiment of this application, optionally, the matrix Q is one of the following matrices:

$$Q = \frac{1}{\sqrt{2}}\begin{bmatrix} 1 & e^{j\theta} \\ 1 & e^{j\theta} \end{bmatrix}, Q = \frac{1}{\sqrt{2}}\begin{bmatrix} 1 & e^{j\theta} \\ 1 & -e^{j\theta} \end{bmatrix},$$

$$Q = \frac{1}{\sqrt{2}}\begin{bmatrix} 1 & e^{j\theta} \\ -1 & e^{j\theta} \end{bmatrix}, Q = \frac{1}{\sqrt{2}}\begin{bmatrix} 1 & e^{j\theta} \\ -1 & -e^{j\theta} \end{bmatrix},$$

$$Q = \frac{1}{\sqrt{2}}\begin{bmatrix} 1 & -e^{j\theta} \\ 1 & e^{j\theta} \end{bmatrix}, Q = \frac{1}{\sqrt{2}}\begin{bmatrix} 1 & -e^{j\theta} \\ 1 & -e^{j\theta} \end{bmatrix},$$

$$Q = \frac{1}{\sqrt{2}}\begin{bmatrix} 1 & -e^{j\theta} \\ -1 & e^{j\theta} \end{bmatrix}, Q = \frac{1}{\sqrt{2}}\begin{bmatrix} 1 & -e^{j\theta} \\ -1 & -e^{j\theta} \end{bmatrix},$$

$$Q = \frac{1}{\sqrt{2}}\begin{bmatrix} -1 & e^{j\theta} \\ 1 & e^{j\theta} \end{bmatrix}, Q = \frac{1}{\sqrt{2}}\begin{bmatrix} -1 & e^{j\theta} \\ 1 & -e^{j\theta} \end{bmatrix},$$

$$Q = \frac{1}{\sqrt{2}}\begin{bmatrix} -1 & e^{j\theta} \\ -1 & e^{j\theta} \end{bmatrix}, Q = \frac{1}{\sqrt{2}}\begin{bmatrix} 1 & -e^{j\theta} \\ -1 & -e^{j\theta} \end{bmatrix},$$

$$Q = \frac{1}{\sqrt{2}}\begin{bmatrix} -1 & -e^{j\theta} \\ 1 & e^{j\theta} \end{bmatrix}, Q = \frac{1}{\sqrt{2}}\begin{bmatrix} -1 & -e^{j\theta} \\ 1 & -e^{j\theta} \end{bmatrix},$$

$$Q = \frac{1}{\sqrt{2}}\begin{bmatrix} -1 & -e^{j\theta} \\ -1 & e^{j\theta} \end{bmatrix}, \text{ and } Q = \frac{1}{\sqrt{2}}\begin{bmatrix} -1 & -e^{j\theta} \\ -1 & -e^{j\theta} \end{bmatrix}.$$

In this embodiment of this application, optionally, the matrix Q is one of the following matrices:

$$Q = \frac{1}{\sqrt{5}}\begin{bmatrix} 1 & 2e^{j\theta} \\ 1 & 2e^{j\theta} \end{bmatrix}, Q = \frac{1}{\sqrt{5}}\begin{bmatrix} 1 & 2e^{j\theta} \\ -1 & 2e^{j\theta} \end{bmatrix},$$

$$Q = \frac{1}{\sqrt{5}}\begin{bmatrix} 1 & 2e^{j\theta} \\ 2 & e^{j\theta} \end{bmatrix}, Q = \frac{1}{\sqrt{5}}\begin{bmatrix} 1 & 2e^{j\theta} \\ -2 & e^{j\theta} \end{bmatrix},$$

$$Q = \frac{1}{\sqrt{5}}\begin{bmatrix} -1 & 2e^{j\theta} \\ 1 & 2e^{j\theta} \end{bmatrix}, Q = \frac{1}{\sqrt{5}}\begin{bmatrix} -1 & 2e^{j\theta} \\ -1 & 2e^{j\theta} \end{bmatrix},$$

$$Q = \frac{1}{\sqrt{5}}\begin{bmatrix} -1 & 2e^{j\theta} \\ 2 & e^{j\theta} \end{bmatrix}, Q = \frac{1}{\sqrt{5}}\begin{bmatrix} -1 & 2e^{j\theta} \\ -2 & e^{j\theta} \end{bmatrix},$$

$$Q = \frac{1}{\sqrt{5}}\begin{bmatrix} 2 & e^{j\theta} \\ 1 & 2e^{j\theta} \end{bmatrix}, Q = \frac{1}{\sqrt{5}}\begin{bmatrix} 2 & e^{j\theta} \\ -1 & 2e^{j\theta} \end{bmatrix},$$

$$Q = \frac{1}{\sqrt{5}}\begin{bmatrix} 2 & e^{j\theta} \\ 2 & e^{j\theta} \end{bmatrix}, Q = \frac{1}{\sqrt{5}}\begin{bmatrix} 2 & e^{j\theta} \\ -2 & e^{j\theta} \end{bmatrix},$$

$$Q = \frac{1}{\sqrt{5}}\begin{bmatrix} -2 & e^{j\theta} \\ 1 & 2e^{j\theta} \end{bmatrix}, Q = \frac{1}{\sqrt{5}}\begin{bmatrix} -2 & e^{j\theta} \\ -1 & 2e^{j\theta} \end{bmatrix},$$

$$Q = \frac{1}{\sqrt{5}}\begin{bmatrix} -2 & e^{j\theta} \\ 2 & e^{j\theta} \end{bmatrix}, \text{ and } Q = \frac{1}{\sqrt{5}}\begin{bmatrix} -2 & e^{j\theta} \\ -2 & e^{j\theta} \end{bmatrix}.$$

In this embodiment of this application, optionally, a value of θ is one of the following values: π/4, 3π/4, −π/4, and −3π/4.

In this embodiment of this application, optionally, a value of N is 3, the lower-order modulation symbol is a QPSK symbol, and the higher-order modulation symbol is a 64 quadrature amplitude modulation QAM symbol.

In this embodiment of this application, optionally, the matrix Q is one of the following matrices:

$$Q = \frac{1}{\sqrt{21}}\begin{bmatrix} 4 & 2 & 1 \\ 1 & 4 & 2 \\ 2 & 1 & 4 \end{bmatrix}, Q = \frac{1}{\sqrt{21}}\begin{bmatrix} 4 & 2 & -1 \\ -1 & 4 & 2 \\ 2 & -1 & 4 \end{bmatrix},$$

$$Q = \frac{1}{\sqrt{21}}\begin{bmatrix} 4 & -2 & 1 \\ 1 & 4 & -2 \\ -2 & 1 & 4 \end{bmatrix}, \text{ and } Q = \frac{1}{\sqrt{21}}\begin{bmatrix} 4 & -2 & -1 \\ 1 & 4 & -2 \\ -2 & -1 & 4 \end{bmatrix}.$$

In this embodiment of this application, optionally, a bandwidth of each of the N channels is 2.16 GHz.

For the multichannel-based signal transmission apparatus according to this embodiment of this application, refer to the procedure of the corresponding multichannel-based signal transmission method in the embodiments of this application. In addition, the units/modules in the apparatus and the foregoing other operations and/or functions are respectively intended to implement a corresponding procedure in the method. For brevity, details are not described herein again.

Figure 12:
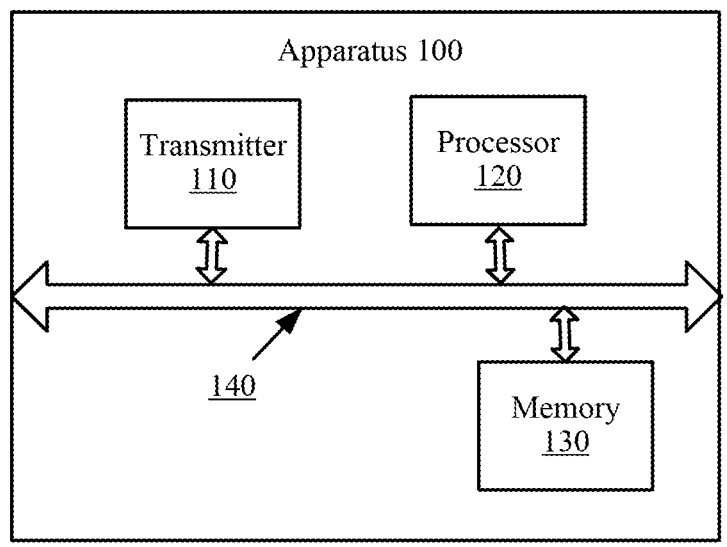
FIG. 12 is a schematic block diagram of a multichannel-based signal transmission apparatus according to another embodiment of this application.

FIG. 12 is a schematic structural diagram of a multichannel-based signal transmission apparatus according to another embodiment of this application. The apparatus in FIG. 12 may perform the method performed by the transmit end device in the procedures in FIG. 6 to FIG. 10. An apparatus 100 in FIG. 12 includes a transmitter no, a processor 120, and a memory 130. The processor 120 controls an operation of the apparatus 100, and may be configured to process a signal. The memory 130 may include a read-only memory and a random access memory, and provide an instruction and data for the processor 120. Components of the apparatus 100 are coupled together by using a bus system 140. In addition to a data bus, the bus system 140 further includes a power bus, a control bus, and a status signal bus. However, for clarity of description, various buses are marked as the bus system 140 in the figure.

The method disclosed in the embodiments of this application may be applied to the processor 120, or may be implemented by the processor 120. In an implementation process, steps of the method may be implemented using an integrated logical circuit of hardware in the processor 120 or using an instruction in a form of software. The processor 120 may be a general purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general purpose processor may be a microprocessor, or any conventional processor or the like. The steps of the method disclosed with reference to the embodiments of this application may be directly performed using a hardware processor, or may be performed using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 130. The processor 120 reads information in the memory 130, and completes the steps of the foregoing method in combination with hardware of the processor.

Specifically, the processor 120 is configured to: combine N groups of lower-order modulation symbols into N groups of higher-order modulation symbols, where an $i^{th}$ higher-order modulation symbol in each group of higher-order modulation symbols is obtained by combining $i^{th}$ lower-order modulation symbols in all the N groups of lower-order modulation symbols, each group of lower-order modulation symbols includes M lower-order modulation symbols, i=1, 2, . . . , M, N is a positive integer greater than 1, and M is a positive integer greater than 1; and determine N to-be-sent signals based on the N groups of higher-order modulation symbols.

The transmitter no is configured to send a $k^{th}$ to-be-sent signal in the N to-be-sent signals using a $k^{th}$ channel in N channels, where k=1, 2, . . . , N.

Therefore, according to the multichannel-based signal transmission apparatus in this embodiment of this application, a plurality of groups of lower-order modulation symbols are combined into a plurality of groups of higher-order modulation symbols, a plurality of to-be-sent signals are generated based on the plurality of groups of higher-order modulation symbols, and the plurality of to-be-sent signals are sent using a plurality of channels. In this way, one lower-order modulation symbol is transmitted on different channels, signal diversity transmission is implemented, and signal transmission reliability is improved.

For the multichannel-based signal transmission apparatus according to this embodiment of this application, refer to the procedure of the multichannel-based signal transmission method in the embodiments of this application. In addition, the units/modules in the apparatus and the foregoing other operations and/or functions are respectively intended to implement a corresponding procedure in the method. For brevity, details are not described herein again.

It should be understood that, "one embodiment" or "an embodiment" mentioned in the whole specification means that particular features, structures, or characteristics related to this embodiment are included in at least one embodiment of this application. Therefore, "in one embodiment" or "in an embodiment" appearing throughout the specification does not necessarily indicate a same embodiment. In addition, these particular features, structures, or characteristics may be combined in one or more embodiments using any appropriate manner.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the embodiments disclosed in this specification, method steps and units may be implemented by electronic hardware, computer software, or a combination thereof. To clearly describe interchangeability between the hardware and the software, steps and compositions of each embodiment have been generally described in the foregoing description based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

In combination with the embodiments disclosed in this specification, methods or steps may be implemented by hardware, a software program executed by a processor, or a combination thereof. The software program may reside in a random access memory (RAM), a memory, a read-only memory (ROM), an electrically programmable read-only memory (EPROM), an electrically erasable programmable read-only memory (EEPROM), a register, a hard disk, a removable magnetic disk, a compact disc read-only memory (CD-ROM), or any other form of storage medium known in the art.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

This application is described in detail with reference to the accompanying drawings and in combination with the embodiments, but this application is not limited thereto. Various equivalent modifications or replacements can be made to the embodiments of this application by a person of ordinary skill in the art without departing from the essence of this application, and these modifications or replacements shall fall within the scope of this application.

The invention claimed is:

1. A method, comprising:
combining N groups of lower-order modulation symbols into N groups of higher-order modulation symbols, wherein each of the N groups of lower-order modulation symbols comprises M lower-order modulation symbols, N is a positive integer greater than 1, and M is a positive integer greater than 1, and wherein combining the N groups of lower-order modulation symbols into the N groups of higher-order modulation symbols comprises:
  for each integer value of i from 1 to M, forming an ith column vector using an ith lower-order modulation symbol from each of the N groups of lower-order modulation symbols; and
  for each integer value of s from 1 to N, determining a product of a row vector of an sth row in a matrix Q and the ith column vector as an ith higher-order modulation symbol in an sth group of higher-order modulation symbols in the N groups of higher-order modulation symbols;
determining N to-be-sent signals based on the N groups of higher-order modulation symbols; and
for each integer value of k from 1 to N, sending a kth to-be-sent signal in the N to-be-sent signals using a kth channel in N channels.

2. The method according to claim 1, wherein determining the N to-be-sent signals based on the N groups of higher-order modulation symbols comprises:
determining N first guard intervals; and
for each integer value of t from 1 to N, inserting a tth first guard interval in the N first guard intervals at a location following a tth group of higher-order modulation symbols in the N groups of higher-order modulation symbols, to obtain a tth to-be-sent signal.

3. The method according to claim 2, wherein determining the N first guard intervals comprises:
determining N groups of first guard signals, wherein each of the N groups of first guard signals comprises G first guard signals, and G is a positive integer greater than 1; and
for each integer value of t from 1 to N, determining a sequence formed by a tth group of first guard signals in the N groups of first guard signals as the tth first guard interval in the N first guard intervals.

4. The method according to claim 3, wherein for each integer value of t from 1 to N, inserting the tth first guard interval in the N first guard intervals at the location following the tth group of higher-order modulation symbols in the N groups of higher-order modulation symbols, to obtain the tth to-be-sent signal, comprises, for each integer value of t from 1 to N, performing the following:
performing a phase shift on an ith higher-order modulation symbol in the tth group of higher-order modulation symbols in the N groups of higher-order modulation symbols, to obtain a tth group of phase-shifted higher-order modulation symbols, wherein a phase shift factor of the phase shift is $e^{j\frac{\pi}{2}i}$;

for each integer value of n from 1 to G, performing a phase shift on an nth first guard signal in the tth first guard interval in the N first guard intervals, to obtain a tth phase-shifted first guard interval, wherein a phase shift factor of the phase shift is $e^{j\frac{\pi}{2}n}$;

and
inserting the tth phase-shifted first guard interval at a location following the tth group of phase-shifted higher-order modulation symbols, to obtain the tth to-be-sent signal.

5. The method according to claim 1, wherein a value of N is 2, each lower-order modulation symbol is a binary phase shift keying (BPSK) symbol, and each higher-order modulation symbol is a quadrature phase shift keying (QPSK) symbol.

6. The method according to claim 1, wherein the matrix Q is one of the following matrices:

$$Q = \frac{1}{\sqrt{2}}\begin{bmatrix} 1 & j \\ 1 & j \end{bmatrix}, Q = \frac{1}{\sqrt{2}}\begin{bmatrix} 1 & j \\ 1 & -j \end{bmatrix}, Q = \frac{1}{\sqrt{2}}\begin{bmatrix} 1 & j \\ -1 & j \end{bmatrix},$$

$$Q = \frac{1}{\sqrt{2}}\begin{bmatrix} 1 & j \\ -1 & -j \end{bmatrix}, Q = \frac{1}{\sqrt{2}}\begin{bmatrix} 1 & -j \\ 1 & j \end{bmatrix}, Q = \frac{1}{\sqrt{2}}\begin{bmatrix} 1 & -j \\ 1 & -j \end{bmatrix},$$

$$Q = \frac{1}{\sqrt{2}}\begin{bmatrix} 1 & -j \\ -1 & j \end{bmatrix}, Q = \frac{1}{\sqrt{2}}\begin{bmatrix} 1 & -j \\ -1 & -j \end{bmatrix}, Q = \frac{1}{\sqrt{2}}\begin{bmatrix} -1 & j \\ 1 & j \end{bmatrix},$$

$$Q = \frac{1}{\sqrt{2}}\begin{bmatrix} -1 & j \\ 1 & -j \end{bmatrix}, Q = \frac{1}{\sqrt{2}}\begin{bmatrix} -1 & j \\ -1 & j \end{bmatrix}, Q = \frac{1}{\sqrt{2}}\begin{bmatrix} -1 & j \\ -1 & -j \end{bmatrix},$$

$$Q = \frac{1}{\sqrt{2}}\begin{bmatrix} -1 & -j \\ 1 & j \end{bmatrix}, Q = \frac{1}{\sqrt{2}}\begin{bmatrix} -1 & -j \\ 1 & -j \end{bmatrix}, Q = \frac{1}{\sqrt{2}}\begin{bmatrix} -1 & -j \\ -1 & j \end{bmatrix},$$

$$\text{or } Q = \frac{1}{\sqrt{2}}\begin{bmatrix} -1 & -j \\ -1 & -j \end{bmatrix};$$

and
wherein j is the j-operator.

7. The method according to claim 1, wherein a bandwidth of each of the N channels is 2.16 GHz or 4.32 GHz.

8. An apparatus, comprising:
a processor, configured to:
  combine N groups of lower-order modulation symbols into N groups of higher-order modulation symbols, wherein each of the N groups of lower-order modulation symbols comprises M lower-order modulation symbols, N is a positive integer greater than 1, and M is a positive integer greater than 1, and combining the N groups of lower-order modulation symbols into the N groups of higher-order modulation symbols comprises:
  for each integer value of i from 1 to M, forming an ith column vector using an ith lower-order modulation symbol from each of the N groups of lower-order modulation symbols; and
  for each integer value of s from 1 to N, determining a product of a row vector of an sth row in a matrix Q and the ith column vector as an ith higher-order modulation symbol in an sth group of higher-order modulation symbols in the N groups of higher-order modulation symbols; and
  determine N to-be-sent signals based on the N groups of higher-order modulation symbols; and
a transceiver, configured to send, for each integer value of k from 1 to N, a kth to-be-sent signal in the N to-be-sent signals using a kth channel in N channels.

9. The apparatus according to claim 8, wherein the processor being configured to determine the N to-be-sent signals based on the N groups of higher-order modulation symbols comprises the processor being configured to:
determine N first guard intervals; and
for each integer value of t from 1 to N, insert a tth first guard interval in the N first guard intervals at a location following a tth group of higher-order modulation symbols in the N groups of higher-order modulation symbols, to obtain a tth to-be-sent signal.

10. The apparatus according to claim 9, wherein the processor being configured to determine the N first guard intervals comprises the processor being configured to:

determine N groups of first guard signals, wherein each of the N groups of first guard signals comprises G first guard signals, and G is a positive integer greater than 1; and for each integer value of t from 1 to N, determine a sequence formed by a tth group of first guard signals in the N groups of first guard signals as the tth first guard interval in the N first guard intervals.

11. The apparatus according to claim 10, wherein the processor being configured to, for each integer value of t from 1 to N, insert the tth first guard interval in the N first guard intervals at the location following the tth group of higher-order modulation symbols in the N groups of higher-order modulation symbols, to obtain the tth to-be-sent signal, comprises the processor is being configured to:

perform a phase shift on an ith higher-order modulation symbol in the tth group of higher-order modulation symbols in the N groups of higher-order modulation symbols, to obtain a tth group of phase-shifted higher-order modulation symbols, wherein a phase shift factor of the phase shift is $$e^{j\frac{\pi}{2}i};$$

for each integer value of n from 1 to G, perform phase shift on an nth first guard signal in the tth first guard interval in the N first guard intervals, to obtain a tth phase-shifted first guard interval, wherein a phase shift factor of the phase shift is $$e^{j\frac{\pi}{2}n};$$

and insert the tth phase-shifted first guard interval at a location following the tth group of phase-shifted higher-order modulation symbols, to obtain the tth to-be-sent signal.

12. The apparatus according to claim 8, wherein a value of N is 2, each lower-order modulation symbol is a binary phase shift keying (BPSK) symbol, and each higher-order modulation symbol is a quadrature phase shift keying (QPSK) symbol.

13. The apparatus according to claim 8, wherein the matrix Q is one of the following matrices:

$$Q = \frac{1}{\sqrt{2}}\begin{bmatrix} 1 & j \\ 1 & j \end{bmatrix}, Q = \frac{1}{\sqrt{2}}\begin{bmatrix} 1 & j \\ 1 & -j \end{bmatrix}, Q = \frac{1}{\sqrt{2}}\begin{bmatrix} 1 & j \\ -1 & j \end{bmatrix},$$

$$Q = \frac{1}{\sqrt{2}}\begin{bmatrix} 1 & j \\ -1 & -j \end{bmatrix}, Q = \frac{1}{\sqrt{2}}\begin{bmatrix} 1 & -j \\ 1 & j \end{bmatrix}, Q = \frac{1}{\sqrt{2}}\begin{bmatrix} 1 & -j \\ 1 & -j \end{bmatrix},$$

$$Q = \frac{1}{\sqrt{2}}\begin{bmatrix} 1 & -j \\ -1 & j \end{bmatrix}, Q = \frac{1}{\sqrt{2}}\begin{bmatrix} 1 & -j \\ -1 & -j \end{bmatrix}, Q = \frac{1}{\sqrt{2}}\begin{bmatrix} -1 & j \\ 1 & j \end{bmatrix},$$

$$Q = \frac{1}{\sqrt{2}}\begin{bmatrix} -1 & j \\ 1 & -j \end{bmatrix}, Q = \frac{1}{\sqrt{2}}\begin{bmatrix} -1 & j \\ -1 & j \end{bmatrix}, Q = \frac{1}{\sqrt{2}}\begin{bmatrix} -1 & j \\ -1 & -j \end{bmatrix},$$

$$Q = \frac{1}{\sqrt{2}}\begin{bmatrix} -1 & -j \\ 1 & j \end{bmatrix}, Q = \frac{1}{\sqrt{2}}\begin{bmatrix} -1 & -j \\ 1 & -j \end{bmatrix}, Q = \frac{1}{\sqrt{2}}\begin{bmatrix} -1 & -j \\ -1 & j \end{bmatrix},$$

$$\text{or } Q = \frac{1}{\sqrt{2}}\begin{bmatrix} -1 & -j \\ -1 & -j \end{bmatrix};$$

and wherein j is the j-operator.

14. The apparatus according to claim 8, wherein a bandwidth of each of the N channels is 2.16 GHz or 4.32 GHz.

* * * * *